US008638337B2

(12) United States Patent
Tung et al.

(10) Patent No.: US 8,638,337 B2
(45) Date of Patent: Jan. 28, 2014

(54) IMAGE FRAME BUFFER MANAGEMENT

(75) Inventors: Jackson Tung, Saratoga, CA (US);
Thomas Young, Foster City, CA (US);
Kai Chee Li, Fremont, CA (US); Jeff B. Widergren, Mount View, CA (US); Hao Guo, Cupertino, CA (US); Francis A. Palita, Goodyear, AZ (US); Hua Zhou, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 743 days.

(21) Appl. No.: 12/405,034

(22) Filed: Mar. 16, 2009

(65) Prior Publication Data
US 2010/0231599 A1    Sep. 16, 2010

(51) Int. Cl.
*G06T 9/00* (2006.01)
(52) U.S. Cl.
USPC .......................................... 345/555; 382/232
(58) Field of Classification Search
USPC .............................................. 345/555
See application file for complete search history.

(56) References Cited

U.S. PATENT DOCUMENTS

| 5,767,797 A | 6/1998 | Yogeshwar et al. |
| 5,861,922 A | 1/1999 | Murashita et al. |
| 6,473,087 B1 | 10/2002 | Tsang |
| 6,667,745 B1 * | 12/2003 | Hussain ........................ 345/545 |
| 6,751,356 B2 | 6/2004 | Oki |
| 6,956,600 B1 | 10/2005 | Gaylord |
| 7,245,242 B2 | 7/2007 | Hu |
| 7,248,257 B2 * | 7/2007 | Elber ............................ 345/419 |
| 7,277,099 B2 | 10/2007 | Valmiki et al. |
| 7,443,318 B2 | 10/2008 | Hung et al. |
| 7,460,725 B2 | 12/2008 | Malladi et al. |
| 7,768,520 B2 | 8/2010 | Deb |
| 2005/0147163 A1 | 7/2005 | Li et al. |
| 2005/0207488 A1 | 9/2005 | Ouyang et al. |
| 2005/0246433 A1 * | 11/2005 | Carrigan et al. .............. 709/223 |
| 2005/0249283 A1 * | 11/2005 | Kajiwara et al. ......... 375/240.12 |
| 2006/0048062 A1 | 3/2006 | Adamson |
| 2006/0072831 A1 | 4/2006 | Pallister |
| 2006/0184614 A1 | 8/2006 | Baratto et al. |
| 2006/0256854 A1 | 11/2006 | Jiang |

(Continued)

FOREIGN PATENT DOCUMENTS

WO    WO 99/11071 A1    3/1999

OTHER PUBLICATIONS

"MPEG Compression," http://www.tslab.ssvl.kth.se/csd/projects/0002/t_mpeg.htm, downloaded Jan. 22, 2009, p. 1-8.

(Continued)

*Primary Examiner* — Said Broome
*Assistant Examiner* — Peter Hoang
(74) *Attorney, Agent, or Firm* — Woodcock Washburn, LLP

(57) ABSTRACT

Disclosed are methods and systems for tracking which data tiles have changed within an image frame. In an embodiment, each cell of a tile change list buffer may contain a frame number and updated when a tile is received from encoder. The frame number may be used as a base pointer for a particular frame buffer. When a frame is decoded, the contents of the tile change list buffer may be copied from the current tile change list buffer to the next buffer. This process may reduce memory traffic because the unchanged tile data does not have to be copied from frame to frame.

20 Claims, 29 Drawing Sheets

(56) References Cited

U.S. PATENT DOCUMENTS

| | | | |
|---|---|---|---|
| 2006/0282855 A1 | 12/2006 | Margulis | |
| 2007/0097130 A1 | 5/2007 | Margulis | |
| 2007/0217518 A1* | 9/2007 | Valmiki et al. | 375/240.24 |
| 2008/0013844 A1* | 1/2008 | Hu | 382/240 |
| 2008/0080620 A1 | 4/2008 | Lee | |
| 2008/0112489 A1 | 5/2008 | Malladi | |
| 2008/0122852 A1 | 5/2008 | Noyle | |
| 2008/0130737 A1 | 6/2008 | Kamariotis et al. | |
| 2008/0232472 A1* | 9/2008 | Kwon | 375/240.13 |
| 2008/0253460 A1 | 10/2008 | Lin | |
| 2008/0253461 A1* | 10/2008 | Lin et al. | 375/240.24 |
| 2008/0317138 A1* | 12/2008 | Jia | 375/240.28 |
| 2009/0010337 A1 | 1/2009 | Wang | |
| 2009/0256851 A1* | 10/2009 | Dunn | 345/547 |
| 2009/0316787 A1 | 12/2009 | Yamaguchi et al. | |

OTHER PUBLICATIONS

"videoDSP," Tensilica, Inc., http://www.tensilica.com/pdf/video.pdf, 2008, p. 1-4.

Lu, X., "WSFRB Protocol and Virtual Program Computing," The 8$^{th}$ International Conference on Computer Supported Cooperative Work in Design Proceedings, IEEE, http://ieeexplore.ieee.org/stamp/stamp.jsp?arnumber=1349069&isnumber=29613, 2003, p. 475-480.

Paul et al., "Chromium Renderserver: Scalable and Open Remote Rendering Infrastructure," IEEE, http://www-vis.lbl.gov/Publications/2008/LBNL-63693-CRRS.pdf, downloaded 2008, p. 1-14.

"3D Graphics Accelaeration Over Remote Desktop," Virtualdub.org, http://www.virtualdub.org/blog/pivot/entry.php?id=208, Jun. 7, 2008, p. 1-3.

Baratto et al., "THINC: A Remote Display Architecture for Thin-Client Computing," Department of Computer Science Colombia University, Technical Report CUCS-027-04, http://www.cs.columbia.edu/techreports/cucs-027-04.pdf, Jul. 2004, p. 1-15.

Capin et al., "The State of the Art in Mobile Graphics Research," IEEE, http://ieeexplore.ieee.org/stamp/stamp.jsp?arnumber=04557959, Jul./Aug. 2008, p. 74-84.

Richardson et al., "Virtual Network Computing," IEEE Internet Computing, http://www.cl.cam.ac.uk/research/dtg/attarchive/pub/docs/att/tr.98.1.pdf, vol. 2(1), Jan./Feb. 1998, p. 33-38.

Yen et al., "A Hardware/Software-Concurrent Jpeg2000 Encoder," IEEE, http://ieeexplore.ieee.org/stamp/stamp.jsp?arnumber=1500050&isnumber=32157, 2005, p. 181-184.

DE Editors, "NVIDIA Delivers 3D Accelerator for Remote & Distributed Visualization," http://www.deskeng.com/articles/aaamrk.htm, Nov. 11, 2008, 1 page.

* cited by examiner

IMAGE FRAME BUFFER MANAGEMENT

CROSS-REFERENCE

This application is related by subject matter to the subject matter disclosed in the following commonly assigned applications, the entirety of which are hereby incorporated by reference herein: U.S. patent application Ser. No. 12/399,627, filed Mar. 6, 2009, titled "Concurrent Encoding/Decoding Of Tiled Data," currently pending; U.S. patent application Ser. No. 12/399,302, filed Mar. 6, 2009, titled "Frame Capture, Encoding, and Transmit Management," currently pending; and U.S. application Ser. No. 11/595,505, filed Nov. 9, 2006, now U.S. Pat. No. 7,460,725 entitled "System And Method For Effectively Encoding And Decoding Electronic Information."

BACKGROUND

Remote computing systems can enable users to access resources hosted by the remote computing systems. Servers on the remote computing systems can execute programs and transmit signals indicative of a user interface to clients that can connect by sending signals over a network conforming to a communication protocol such as the TCP/IP protocol. Each connecting client may be provided a session, i.e., an execution environment that includes a set of resources. Each client can transmit signals indicative of user input to the server and the server can apply the user input to the appropriate session. The clients may use protocols such as the Remote Desktop Protocol (RDP) to connect to a server resource.

However, the decoding and rendering of the image data on the client computers typically requires a great deal of resources. Such resources include computational cycles, memory for frame buffers, and network bandwidth. In order to improve the user experience, the image frames may be divided into data tiles so that only the changed tiles are transmitted. Client devices typically employ front and back buffers so that one buffer can receive new frame data while the other is used to drive the current display. However, if only the changed tiles are stored in the buffer, the unchanged tiles will contain stale data and the rendered image may display tearing or other undesirable effects. To avoid these effects, the unchanged tiles must be transferred from one buffer to the other. However, such memory transfers takes time and slows down the rendering process. Thus, other techniques are needed in the art to solve the above described problems.

SUMMARY

In various embodiments, methods and systems are disclosed for receiving the changed tiles of an image frame, storing the data in a plurality of buffers and tracking the changed tiles and their location. A current display image may be formed by retrieving the appropriate tiles to form a complete frame by using the tracking information. In an embodiment, a tile change list buffer may be used for tracking which tiles have changed within a decoded frame. Each cell of the tile change list buffer may contain a frame number and may be updated when a tile is received from the encoder. The frame number may be used as a base pointer for a particular frame buffer. When a frame is completely decoded, the contents of the tile change list buffer may be copied from the current tile change list buffer to the next buffer. This process may reduce the memory traffic by avoiding copying the unchanged tile data from frame to frame.

Various aspects are disclosed herein for using a virtual buffer management function to drive a display controller. The display frame buffer may retrieve tiles from across the plurality of physical frame buffers. Memory addresses may be calculated on the fly as a function of the tile change list information.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Computing Environments In General Terms

Figure 1:
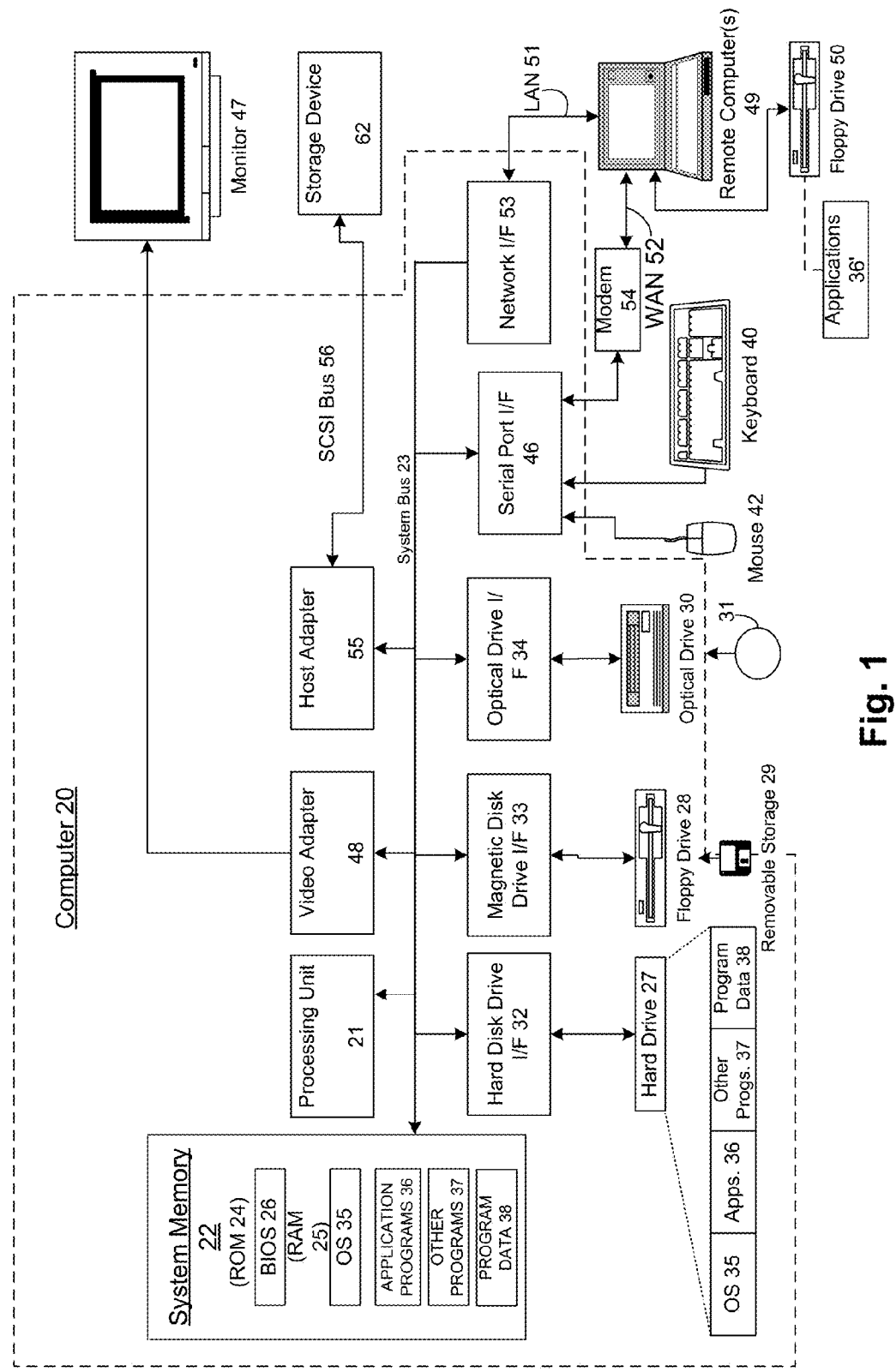
FIG. 1 depicts an example computer system wherein aspects of the present disclosure can be implemented.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 2:
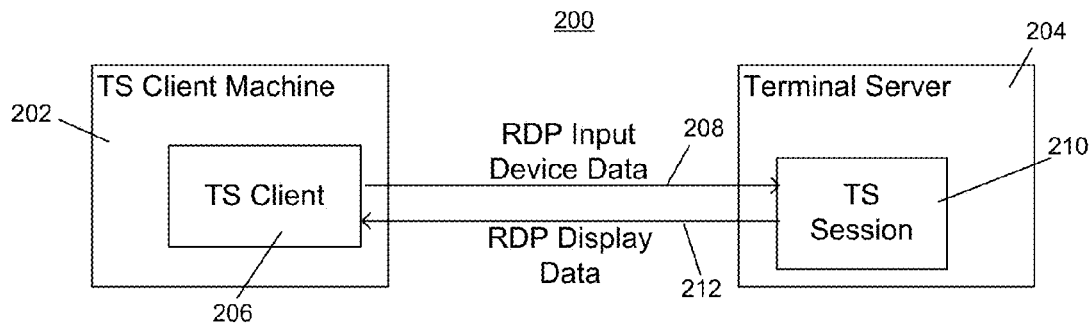
FIGS. 2 thru 4 depict an operational environment for practicing aspects of the present disclosure.

FIG. 2 shows an implementation 200 enabling terminal services. A TS client machine 202 and a TS 204 communicate using RDP. The TS client machine 202 runs a TS client process 206 that sends RDP input device data 208, such as for example keyboard data and mouse click data, to a TS session 210 that has been spawned on the TS and receives RDP display data 212, such as user interface graphics data. Generally, the TS client process 206 is a thin client process and most processing is provided on the TS 204.

Figure 3:
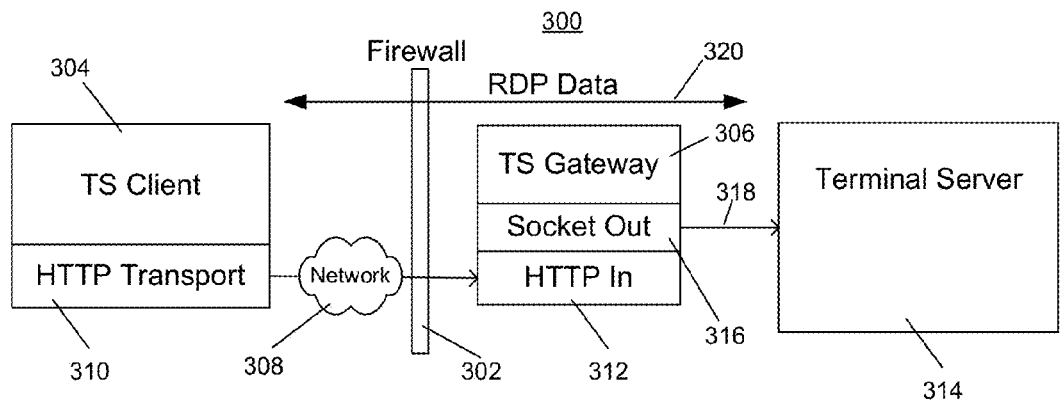

FIG. 3 shows an implementation 300 enabling terminal services through a firewall 302. A remote TS client 304 connects to a terminal services gateway (TSG) 306 over a network 308. A Hypertext Transfer Protocol (HTTP) transport process 310 on the TS client and an HTTP process 312 on the TSG 306 facilitate communication through the firewall 302. The HTTP transport process 310 wraps data, such as Remote Procedure Call (RPC) data or RDP data, in HTTPS headers for the TSG 306. The TSG 306 may connect to the TS 314 over a socket connection 318 via a socket out process 316. Once the TS client 304 is authenticated and a connection is established, RDP data 320 may be passed back and forth between the TS client 304 and the TS 314.

Figure 4:
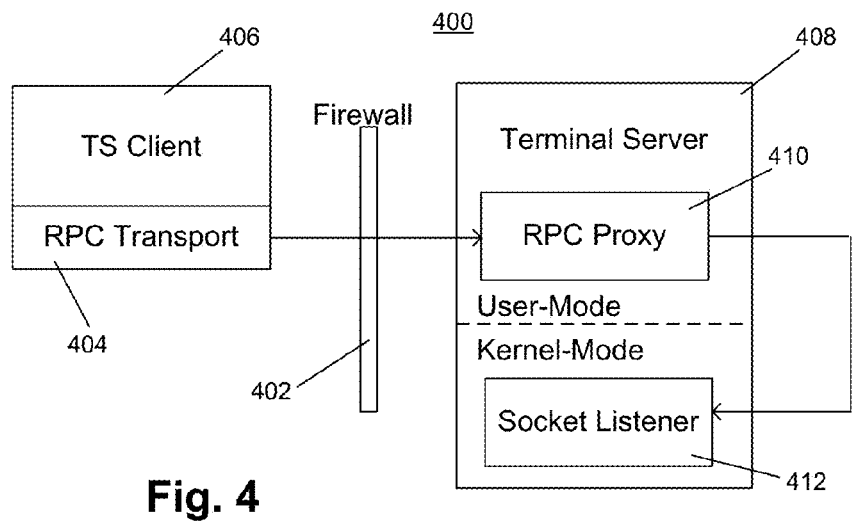

FIG. 4 shows a generalized example of an implementation 400, wherein an existing remote procedure call/hypertext transport protocol (RPC/HTTP) proxy is leveraged, thereby providing a terminal services protocol, such as RDP, over an RPC/HTTP connection through a firewall 402. The architecture of the implementation illustrates that by wrapping the RDP protocol within RPC calls, an existing RPC-based proxy can be advantageously utilized. In particular, an RPC Transport Plug-In 404 on the TS client 406 wraps an RDP stream providing communication between the TS client 406 and the terminal server 408 within an RPC protocol. This facilitates utilization of an RPC-based proxy, thereby enabling firewall navigation. The RPC-based proxy 410, which may run in a user-mode on the TS, can forward received data to a socket listener 412, which may run in kernel-mode on the TS.

As discussed above, clients may use a remote protocol such as Remote Desktop Protocol (RDP) to connect to a resource using terminal services. When a remote desktop client connects to a terminal server via a terminal server gateway, the gateway may open a socket connection with the terminal server and redirect client traffic on the RDP port or a port dedicated to remote access services. The gateway may also perform certain gateway specific exchanges with the client using a terminal server gateway protocol transmitted over HTTPS.

Figure 1A:
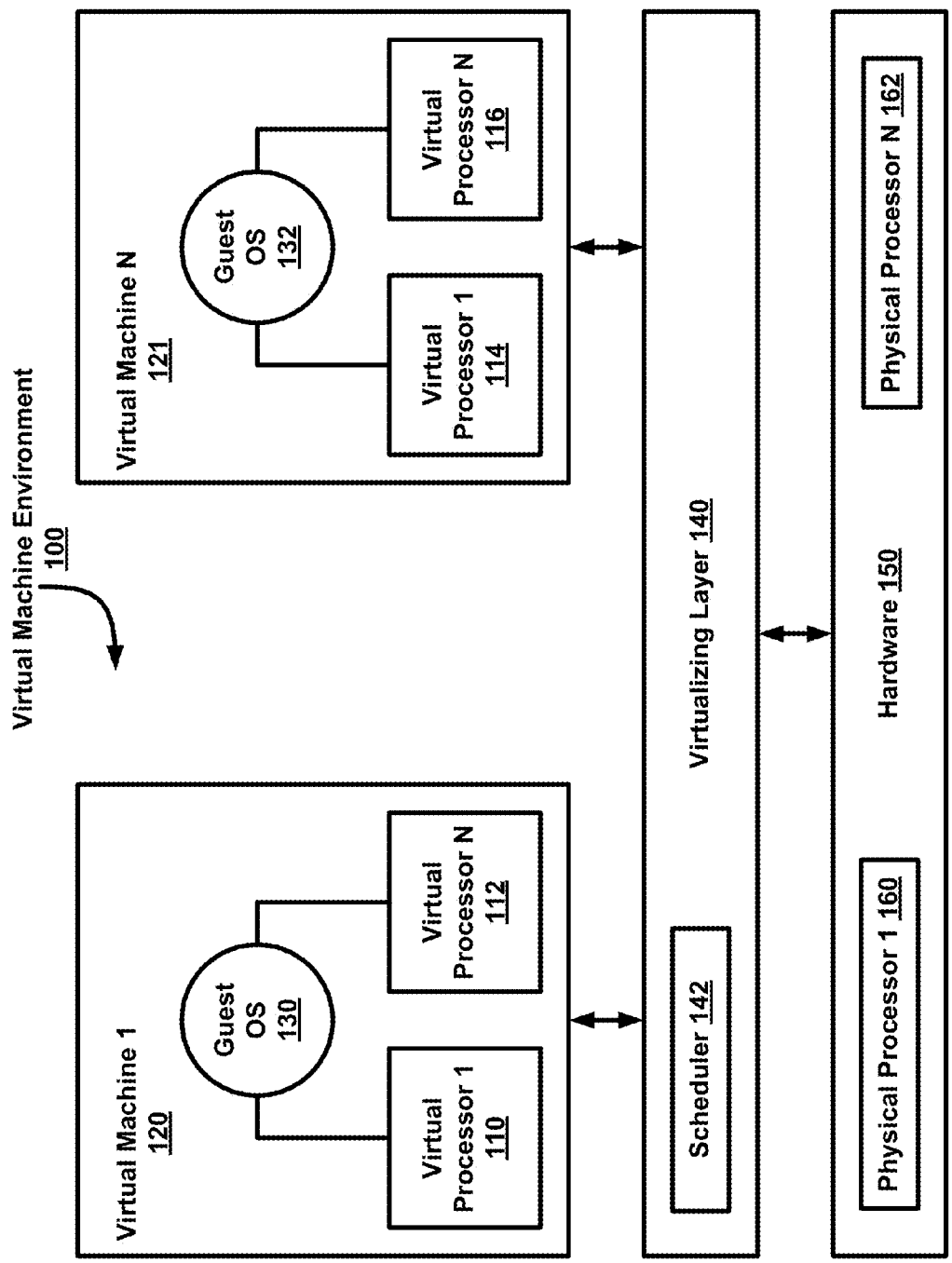
FIG. 1a illustrates a virtual machine environment, with a plurality of virtual machines, comprising a plurality of virtual processors and corresponding guest operating systems; the virtual machines are maintained by a virtualizing layer which may comprise a scheduler and other components, where the virtualizing layer virtualizes hardware for the plurality of virtual machines.

A virtual machine monitor, such as a hypervisor, is a program that creates virtual machines, each with virtualized hardware resources which may be backed by underlying physical hardware resources. FIG. 1a illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may comprise of a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162.

All of these variations for implementing the above mentioned partitions are just exemplary implementations, and nothing herein should be interpreted as limiting the disclosure to any particular virtualization aspect.

Encoding/Decoding Of Tiled Data

Described herein is a system and method for encoding and decoding electronic information, and may include an encoding system with a tiling module that initially divides source image data into data tiles. A frame differencing module may then output only altered data tiles to various processing modules that convert the altered data tiles into corresponding tile components.

In an embodiment, a quantizer may perform a compression procedure upon the tile components to generate compressed data according to an adjustable quantization parameter. An adaptive entropy selector may then select one of a plurality of available entropy encoders to perform an entropy encoding procedure to thereby produce encoded data. The entropy encoder may also utilize a feedback loop to adjust the quantization parameter in light of current transmission bandwidth characteristics.

The process of encoding and decoding may generally use one or more methods and systems described in commonly assigned U.S. Pat. No. 7,460,725 entitled "System And Method For Effectively Encoding And Decoding Electronic Information," hereby incorporated by reference in its entirety.

Figure 5:
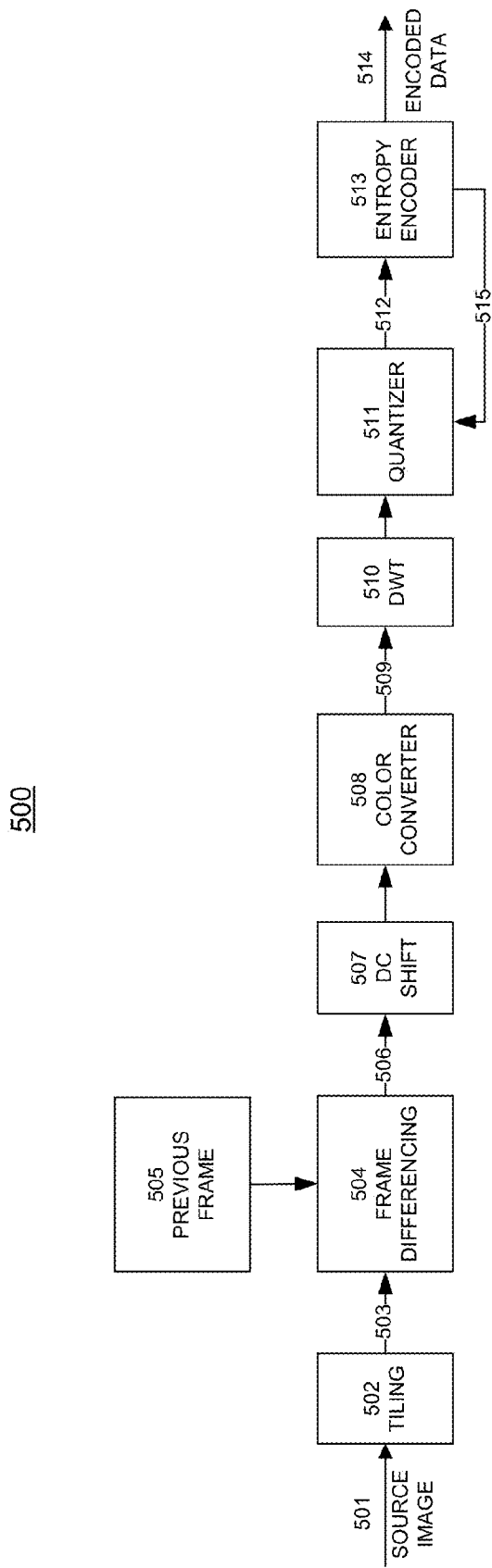
FIG. 5 illustrates a block diagram depicting one embodiment of an encoding system.

Referring to FIG. 5, a block diagram of an encoding system 500 is shown, in accordance with one embodiment of the present disclosure. In alternate embodiments, encoding system 500 may be implemented using components and configurations in addition to, or instead of, certain of those components and configurations discussed below in conjunction with the FIG. 5 embodiment. For example, in the FIG. 5 embodiment, encoding system 500 is discussed in the context of processing image data. However, in alternate embodiments, certain concepts and techniques from the present disclosure may be similarly utilized for processing other types of electronic information.

In the FIG. 5 embodiment, encoding system 500 may initially receive source image 501 as a frame of image data from any appropriate data source. A tiling module 502 then divides source image 501 into individual tiles that are implemented as contiguous sections of image data from source image 501. The individual tiles may be configured in any desired manner. For example, in certain embodiments, an individual tile may be implemented as a pixel array that is 128 pixels wide by 128 pixels high.

A frame differencing module 504 may compare the current source image 501, on a tile-by-tile basis, with similarly-located comparison tiles from a previous frame 505 of input image data. To reduce the total number of tiles that require encoding, frame differencing module 504 then outputs via path 506 only those altered tiles from the current source image 501 that are different from corresponding comparison tiles in previous frame 505.

DC shift module 507 may next add a constant DC voltage value to each pixel from the tiles that are output from frame differencing module 504. A color converter 508 also converts each of the tiles from a first color format to a second color format that is appropriate for further processing by encoding system 500. For example, in certain embodiments, source image 501 may initially be received in an RGB format that color converter 508 then responsively converts into a corresponding YUV format.

A discrete wavelet transform module (DWT) 510 may perform a known discrete wavelet transform procedure to transform the individual YUV components of the tiles into corresponding YUV tile subbands. Additional details of discrete wavelet transforms are further discussed in "The JPEG 2000 Still Image Compression Standard," by Athanassios Skodras et al., published in IEEE Signal Processing Magazine, September 2001.

A quantizer module 511 may next perform a quantization procedure by utilizing appropriate quantization techniques to compress the tile subbands. In the FIG. 5 embodiment, quantizer 511 may produce compressed image data 512 by reducing the bit rate of the tiles according to a particular compression ratio that may be specified by an adaptive quantization parameter 515 received via a feedback loop from entropy encoder 513.

Entropy encoder 513 may perform an entropy encoding procedure to generate encoded data 514. In certain embodiments, the entropy encoding procedure further reduces the bit rate of the compressed image data by substituting appropriate codes for corresponding bit patterns in the compressed image data received from quantizer 511.

In certain alternate embodiments, a System-On-Chip (SOC) device may include encoding system 500 in conjunction with a Central Processing Unit (CPU) and/or a Graphics Processing Unit (GPU). The Graphics Processing Unit may programmatically perform a Discrete Wavelet Transform analysis function to feed subbands to a quantizer. The Graphics Processing Unit may also include Context-Adaptive Binary Arithmetic Coding (CABAC) encoders for generating encoded data from the compressed data received from the quantizer.

This form of integration is efficient because the data for encoding is available to the Graphics Processing Unit, and does not have to be provided by Direct Memory Access techniques into memory of the encoding systems for processing. A corresponding decoding system or System-On-Chip may include other processing elements including a Graphics Processing Unit for performing traditional graphics processing operations such as Bit Block Transfers (BitBlit), up and down scaling, line drawing, as well as supporting a robust windowing system.

In the FIG. 5 embodiment, encoding system 500 is disclosed and discussed as being implemented primarily as hardware circuitry. In certain embodiments, encoding system 500 may be implemented as a single integrated-circuit device. However, in alternate embodiments, some or all of the functions of the present disclosure may be performed by appropriate software instructions that are executed to effectively perform various functions discussed herein.

Figure 6:
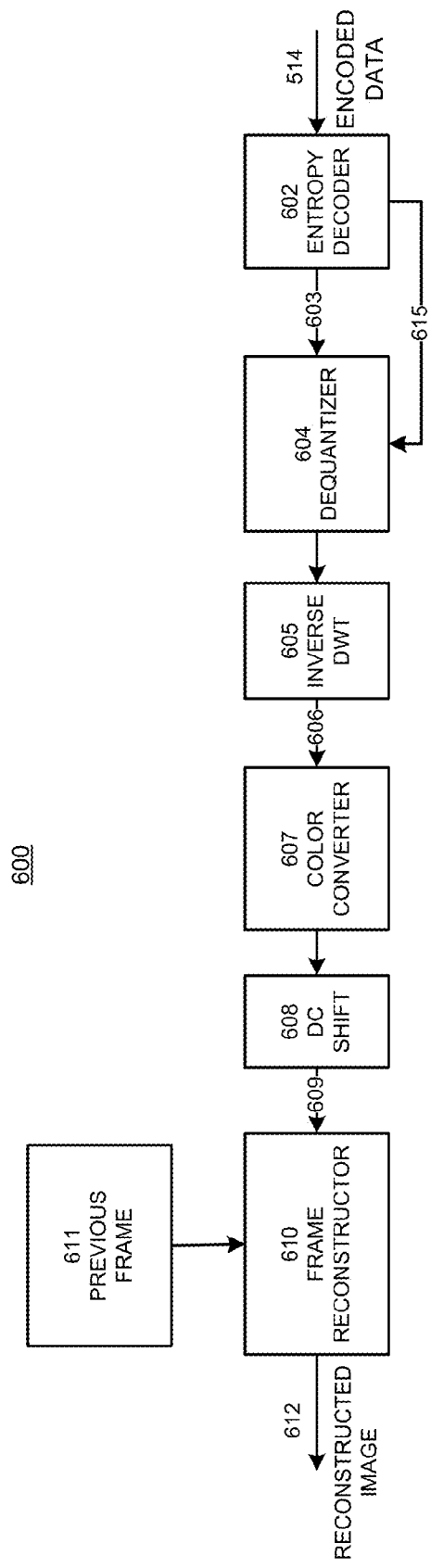
FIG. 6 illustrates a block diagram depicting one embodiment of an decoding system.

Referring now to FIG. 6, a block diagram of a decoding system 600 is shown, in accordance with one embodiment of the present disclosure. In alternate embodiments, decoding system 600 may be implemented using components and configurations in addition to, or instead of, certain of those components and configurations discussed in conjunction with the FIG. 6 embodiment. For example, in the FIG. 6 embodiment, decoding system 600 is discussed in the context of processing image data. However, in alternate embodiments, certain concepts and techniques from the present disclosure may be similarly utilized for processing other types of electronic information.

In the FIG. 6 embodiment, decoding system 600 may initially receive encoded data 514 that is provided from one or more data sources in any appropriate encoding format. An entropy decoder 602 may perform an entropy decoding procedure to convert encoded data 514 into compressed image data 603. In certain embodiments, the entropy decoding procedure increases the bit rate of encoded data 514 by substituting appropriate bit patterns for corresponding codes in the encoded data 514 to produce compressed image data 603 in a YUV format.

A dequantizer module 604 next performs a dequantization procedure by utilizing appropriate dequantization techniques for decompressing the compressed image data 603 to produce various corresponding tile subbands. For example, in certain embodiments, dequantizer 604 produces the tile subbands by performing dequantization based upon the quantization setting of quantizer 511 during encoding. In the FIG. 6 embodiment, an inverse discrete wavelet transform module (inverse DWT) 605 may perform a known inverse discrete wavelet transform procedure to reverse a corresponding discrete wavelet transform procedure by converting individual tile subbands into corresponding individual tiles that are output on path 606.

A color converter 607 may then convert each of the individual tiles from a first color format to a second color format for further processing by decoding system 600. For example, in certain embodiments, the individual tiles received by color converter 607 may be converted from a YUV format into a corresponding RGB format. A DC shift circuit 608 may next subtract a predetermined constant DC voltage value from each pixel of the tiles that are output from color converter 607.

A frame reconstructor 610 may then compare the current frame of image data, on a tile-by-tile basis, with similarly-located comparison tiles from a previous frame 611 of image data to reconstruct the current frame with the total number of tiles that were previously subject to a frame differencing procedure by frame differencing module 104 of FIG. 5. Frame reconstructor 610 may then output the reconstructed image 612 for utilization by any appropriate entity.

Furthermore, in certain alternate embodiments, decoding system 600 may be implemented as part of a System-On-Chip (SOC) device in which a CABAC decoder of decoding system 600 is shared by inverse DWT 605 and an H.264 Integer Transform decoding system. The CABAC decoder may process data in an H.264 mode and in an enhanced Discrete Wavelet Transform mode under program control. The CABAC encoder may operate on a wavelet-based tile in Discrete Wavelet Transform mode, and may process a separate video bitstream for the H.264 mode.

In the FIG. 6 embodiment, decoding system 600 is disclosed and discussed as being implemented primarily as hardware circuitry. In certain embodiments, decoding system 600 may be implemented as a single integrated-circuit device. However, in alternate embodiments, some or all of the functions of the present disclosure may be performed by appropriate software instructions that are executed to effectively perform various functions discussed herein.

Figure 7:
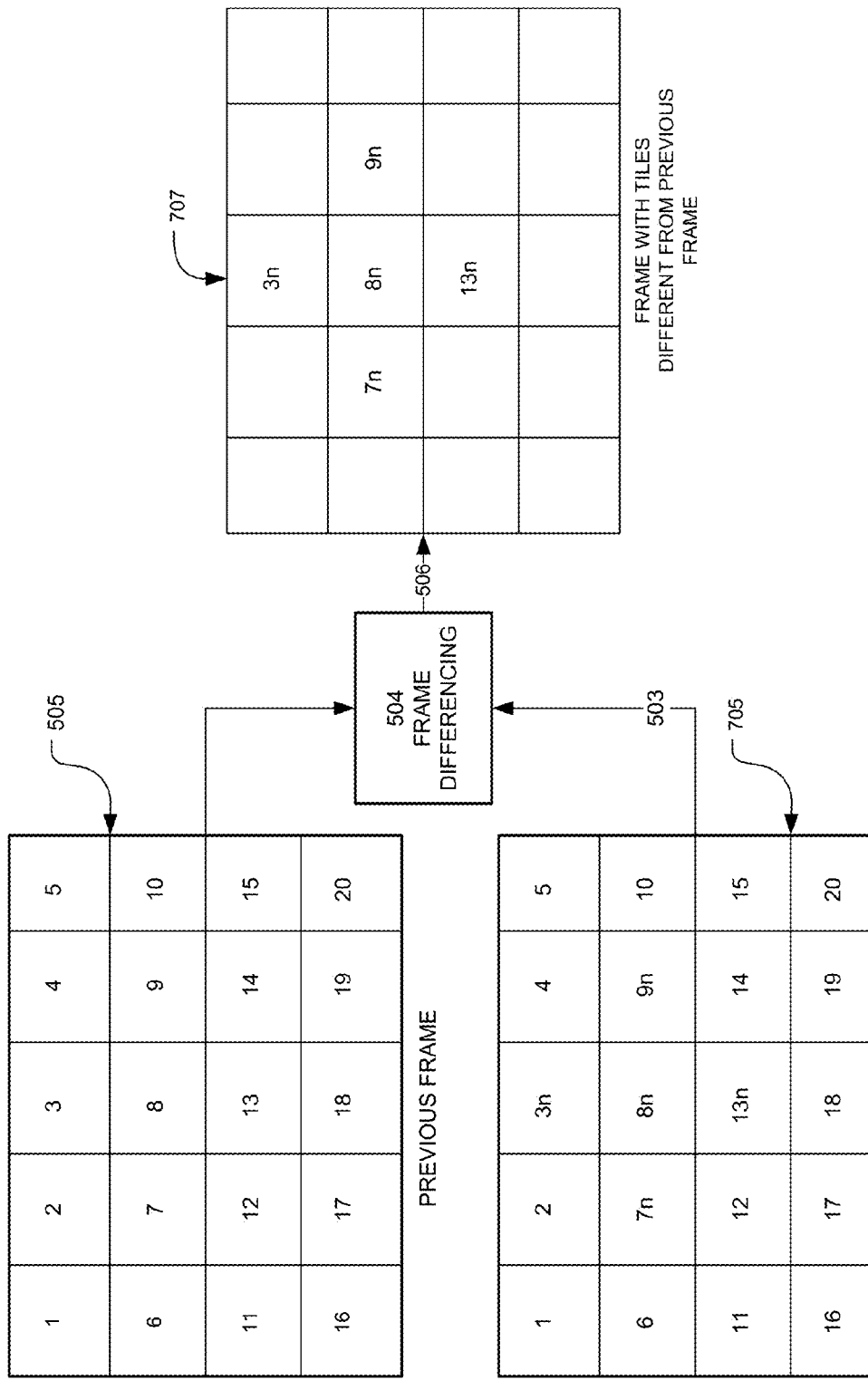
FIG. 7 illustrates one embodiment of a frame differencing procedure.

Referring now to FIG. 7, a diagram illustrating a frame differencing procedure is shown, in accordance with one embodiment of the present disclosure. The embodiments depicted in FIG. 7 and following are presented for purposes of illustration, and in alternate embodiments, the present disclosure may readily perform frame differencing procedures using techniques and configurations in addition to, or instead of, certain of those techniques and configurations discussed in conjunction with the depicted embodiments.

In the FIG. 7 embodiment, frame differencing module 504 may store a previous frame 505 of image data that has been segmented into a series of discrete tiles 1-20 by tiling module 502 (FIG. 5). In the FIG. 7 embodiment, frame differencing module 504 performs the frame differencing procedure using any appropriate techniques for comparing corresponding tiles of previous frame 505 and current frame 705 to determine whether the pixels in any of the compared tiles have been altered.

In the FIG. 7 drawing, for purposes of illustration, altered tiles in current frame 705 are indicated with the letter "n" following the tile number. For example, current frame 705 includes altered tiles 3n, 7n, 8n, 9n, and 13n. Instead of processing all current frames 705, frame differencing module 504 efficiently outputs via path 506 only those altered tiles that are different from corresponding tiles from previous frame 505. In the FIG. 7 embodiment, frame differencing module 504 outputs an altered frame 707 that is populated only with altered tiles 3n, 7n, 8n, 9n, and 13n. If a current frame 705 exhibits no changed tiles with respect to previous frame 505, then the unaltered current frame 705 is not output by frame differencing module 504. The foregoing frame differencing procedure may significantly reduce the processing requirements for encoding system 500 (FIG. 5) and decoding system 600 (FIG. 6).

Figure 8:
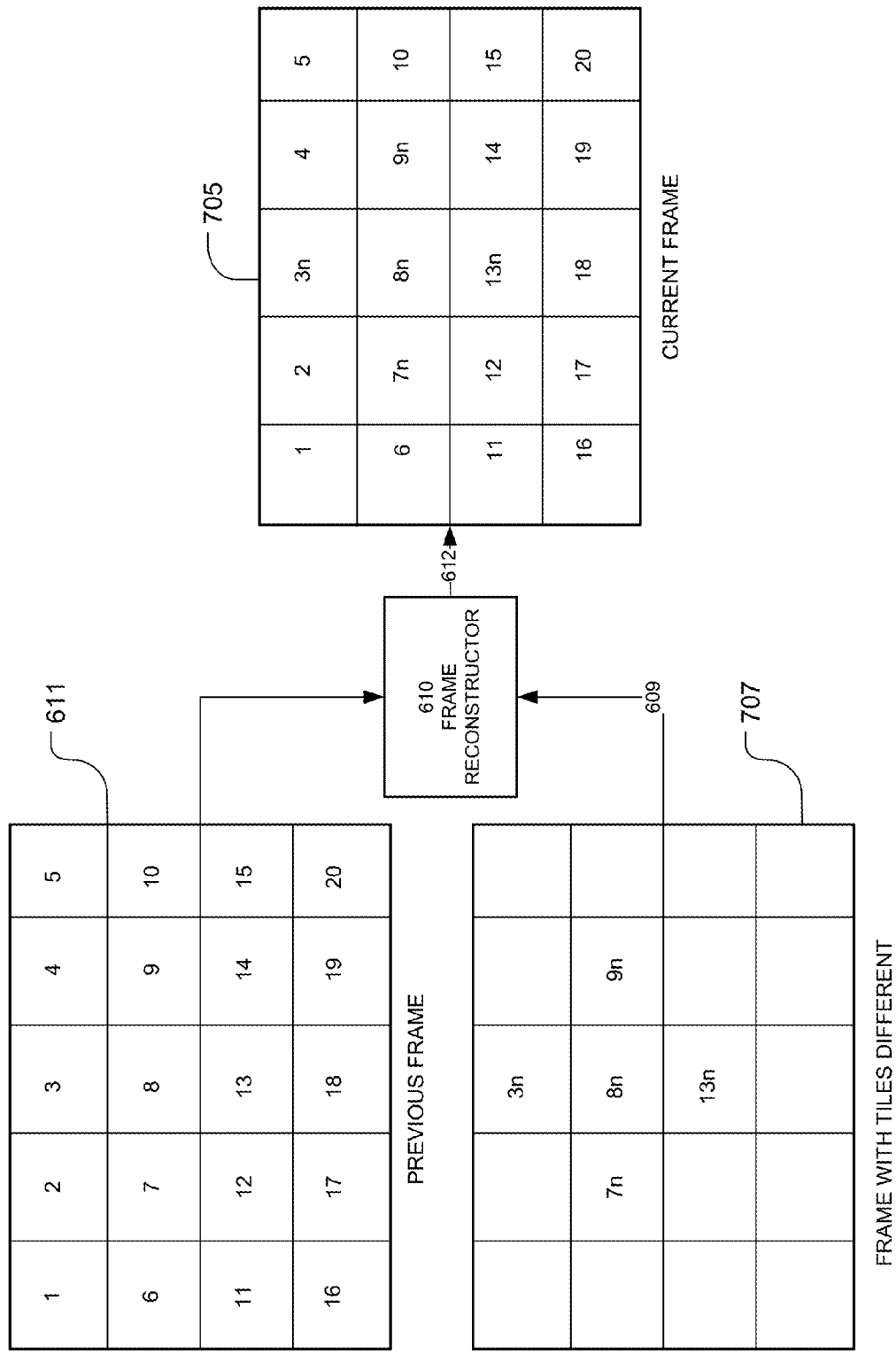
FIG. 8 illustrates one embodiment of a frame reconstruction procedure.

Referring now to FIG. 8, a diagram illustrating a frame reconstruction procedure is shown, in accordance with one embodiment of the present disclosure. In the FIG. 8 embodiment, frame reconstructor 610 may store a previous frame 611 of image data that is segmented into a series of discrete tiles 1-20. Frame reconstructor module 610 may perform the frame reconstruction procedure using appropriate techniques for comparing corresponding tiles of previous frame 611 and a received frame 707 to determine whether the pixels in any of the compared tiles have been altered. Received frame 707 preferably is the same or similar to the "frame with tiles different from previous frame" that is shown as the output of frame differencing module 504 in FIG. 6.

In the FIG. 8 drawing, for purposes of illustration, altered tiles in frame 707 are indicated with the letter "n" following the tile number. For example, frame 707 includes altered tiles 3n, 7n, 8n, 9n, and 13n. To reverse the frame differencing procedure described in FIG. 7, frame reconstructor 610 may utilizes any number of appropriate techniques to reconstruct the original current frame 705 that was initially processed by frame differencing module 504 in FIG. 7. For example, frame reconstructor 610 may output a current frame 705 that is populated with the altered tiles 3n, 7n, 8n, 9n, and 13n from frame 707, and the remaining unaltered tiles 1-2, 4-6, 10-12, and 14-20 from previous frame 611. The foregoing frame reconstruction procedure thus supports the prior frame differencing procedure of FIG. 7 to provide significantly reduced processing requirements for encoding system 500 (FIG. 5) and decoding system 600 (FIG. 6).

Figure 9:
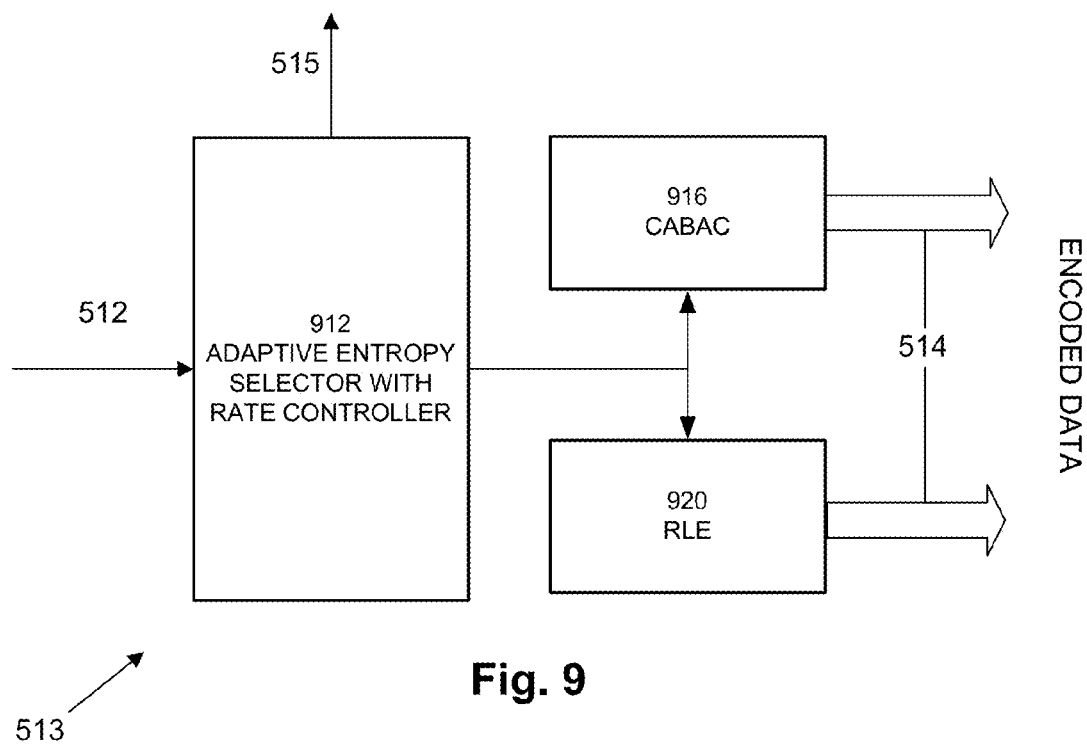
FIG. 9 illustrates one embodiment of an entropy encoder.

Referring now to FIG. 9, a block diagram for the FIG. 5 entropy encoder 513 is shown, in accordance with one embodiment of the present disclosure. In alternate embodiments, entropy encoder 513 may be implemented using components and configurations in addition to, or instead of, certain of those components and configurations discussed in conjunction with the FIG. 9 embodiment.

In the FIG. 9 embodiment, entropy encoder 513 may include an adaptive entropy selector 912 (including a rate controller), a Context-Based Adaptive Binary Arithmetic Coding (CABAC) Encoder 916, and a Run-Length Encoding encoder (RLE) 920. CABAC encoder 916 may be selected to perform an entropy encoding procedure in accordance with a known H.264 CABAC standard. Further details about the H.264 CABAC encoding process are discussed in "Context-Based Adaptive Binary Arithmetic Coding," by Marpe, Detlev, et al., in the H.264/AVC Video Compression Standard, IEEE Transactions On Circuits And Systems For Video Technology, Vol. 13, No. 7, July 2003.

Entropy encoder 513 may alternately select and activate RLE encoder 920 to perform entropy encoding procedures in accordance with certain known run-length encoding techniques. Further details about various types of run-length encoding techniques may be found and reviewed on-line at the following Internet web page address: http://en.wikipedia.org/wiki/Run-length_encoding.

The CABAC encoder 916 is typically implemented as one or more hardware circuits, while RLE encoder 920 is typically implemented to perform entropy encoding procedures in response to the execution of entropy encoding software instructions.

In the FIG. 9 embodiment, adaptive entropy selector 912 may initially receive compressed data 512 from quantizer 511 of FIG. 5. Adaptive entropy selector 912 may sense currently available transmission bandwidth and memory resources for entropy encoder 513. Because certain versions of encoding system 500 and/or decoding system 200 may not support CABAC encoding and/or decoding, adaptive entropy selector 912 may also determine whether CABAC encoders/decoders are available for performing corresponding entropy encoding and/or decoding processes.

Based upon the foregoing encoding selection criteria, adaptive entropy selector 912 may be configured to select either CABAC encoder 916 or RLE encoder 920 to perform the current entropy encoding procedure. For example, if available transmission bandwidth and memory resources are relatively low, adaptive entropy selector 912 may select CABAC encoder 916. Similarly, if a higher degree of compression is required, adaptive entropy selector 912 may select CABAC encoder 916. Alternately, if CABAC encoding is not currently supported, adaptive entropy selector 912 may select RLE encoder 920. Similarly, if transmission bandwidth and memory resources are sufficiently available, then adaptive entropy selector 912 may consider selecting RLE encoder 920 for performing the entropy encoding process.

Adaptive entropy selector 912 may include a rate controller that adjusts and provides an adaptive quantization parameter 515 via a feedback loop to quantizer 511 (FIG. 5) to produce compressed image data 512 by altering the bit rate of compressed image data 512 according to a particular compression ratio that is specified by the adaptive quantization parameter 515. The rate controller of adaptive entropy selector 912 may determine picture quality characteristics of encoded data 514 by utilizing various appropriate criteria or techniques.

The rate controller of adaptive entropy selector 912 may then adjust adaptive quantization parameter 515 to decrease the amount of compression if encoded data 514 exhibits unacceptable picture quality, or if bandwidth characteristics of the downstream channel are insufficient. Conversely, the rate controller may adjust adaptive quantization parameter 515 to increase the amount of compression if the picture quality of encoded data 514 is not particularly critical. In addition, the rate controller may adjust adaptive quantization parameter 515 to decrease the amount of compression in compressed image data 512 when available memory and/or transmission bandwidth becomes relatively scarce. Conversely, the rate controller may adjust adaptive quantization parameter 515 to increase compression levels of compressed image data 512 when available memory and/or transmission bandwidth is sufficiently available and improved picture quality is desired.

Figure 10:
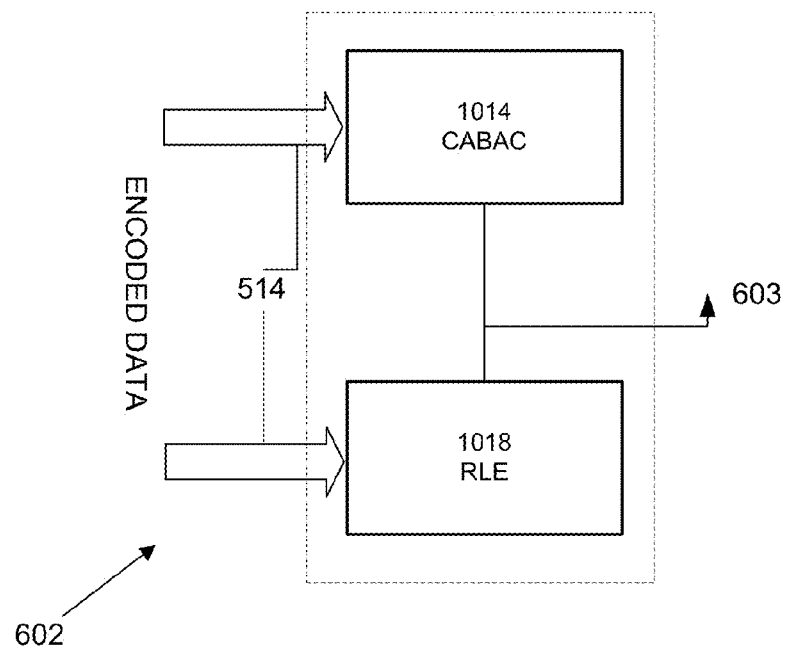
FIG. 10 illustrates one embodiment of an entropy decoder.

Referring now to FIG. 10, a block diagram for the FIG. 6 entropy decoder 602 is shown, in accordance with one embodiment of the present disclosure. In the FIG. 10 embodiment, entropy decoder 602 may include a CABAC decoder 1014 and an RLE decoder 1018. CABAC decoder 1014 may be selected to perform known entropy decoding procedures to effectively reverse the entropy encoding procedure performed by CABAC encoder 516 of FIG. 9. In certain embodiments, CABAC decoder 1014 may be selected to perform an entropy decoding procedure in accordance with a known H.264 CABAC standard that is discussed above in conjunction with FIG. 9.

Alternately, RLE decoder 920 may be selected to perform known entropy decoding procedures to effectively reverse the entropy encoding procedure performed by RLE encoder 920 of FIG. 9. In certain embodiments, entropy decoder 602 may select RLE decoder 1018 to perform appropriate entropy decoding procedures in accordance with various known run-length decoding standards that are discussed above in conjunction with RLE encoder 920 of FIG. 9.

Entropy encoder 602 may initially receive encoded data 514 from any appropriate data source. In response, entropy encoder 602 may analyze encoded data 514 to determine whether encoded data 514 is configured in a CABAC-encoded format or in an RLE-encoded format. Entropy encoder 602 may then activate either CABAC decoder 1014 or RLE decoder 1018 to perform an entropy decoder procedure, depending upon the type of encoding format of the encoded data 514.

For example, if encoded data 514 is received in a CABAC-encoded format, then entropy decoder may 602 utilize CABAC decoder 1014 to decode encoded data 514 to provide corresponding compressed image data 603 to dequantizer 204 (FIG. 6). Alternatively, if encoded data 514 is received in an RLE-encoded format, then entropy decoder 602 may utilize RLE decoder 920 to decode encoded data 514 to provide corresponding compressed image data 603 to dequantizer 204.

Figure 11:
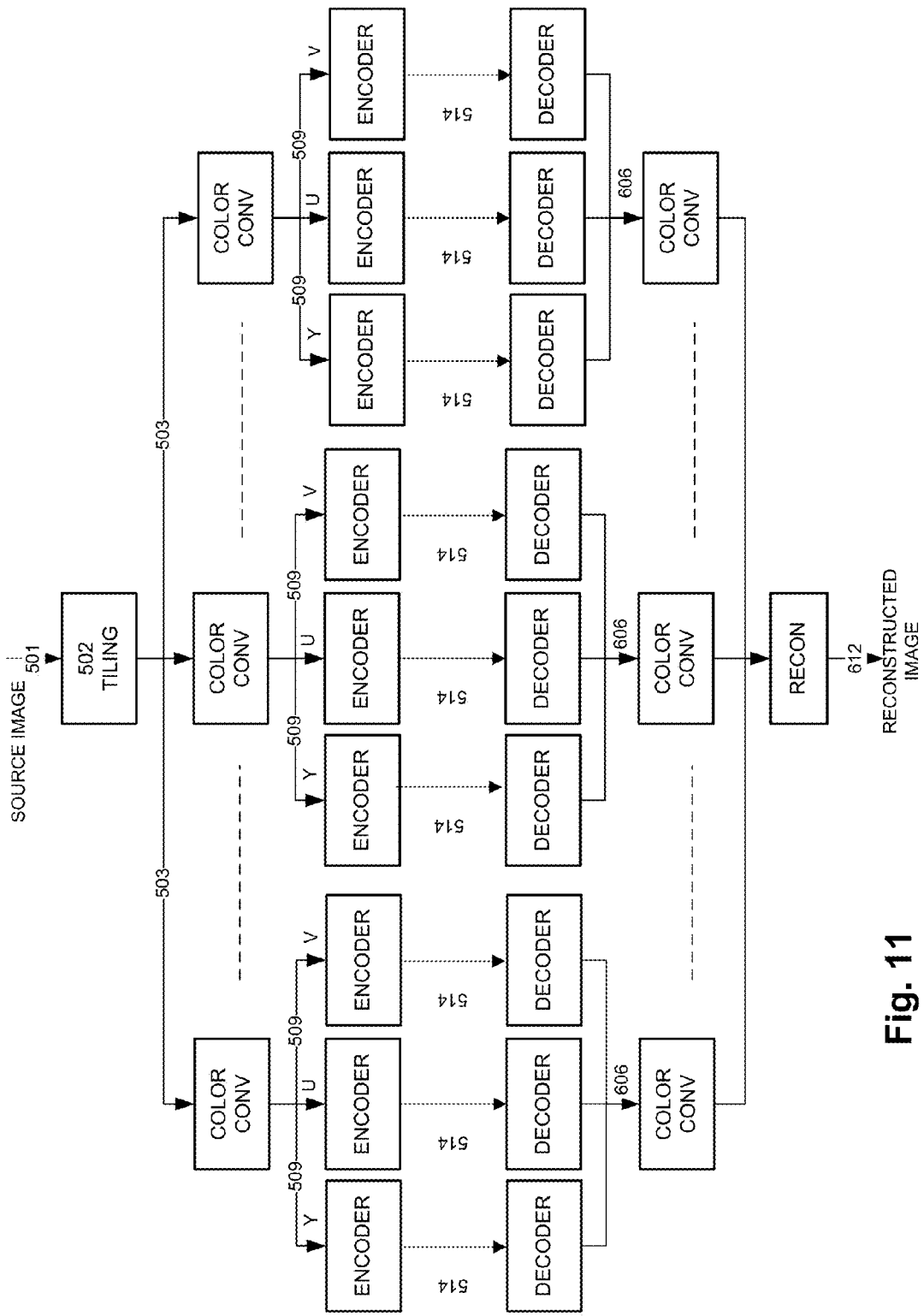
FIG. 11 illustrates one embodiment of a multiple encoder-decoder architecture.

Referring now to FIG. 11, a block diagram for a multiple encoder-decoder architecture is shown, in accordance with one embodiment of the present disclosure. In the FIG. 11 embodiment, a tiling module 502 initially receives a source image 501 as a frame of image data from any appropriate data source. Tiling module 502 then divides source image 501 into individual tiles that are preferably implemented as contiguous sections of image data from source image 501. The individual tiles 503 are each sent to one of a series of different color converters that each convert respective received tiles from a first color format to a second color format. For example, in certain embodiments, source image 501 may initially be received in an RGB format which the color converters responsively convert into corresponding YUV components 509 on a tile-by-tile basis.

A series of encoders are shown configured in parallel to concurrently encode the YUV components 509. These encoders may be implemented in any appropriate manner. For example, in certain embodiments, each of the encoders may be implemented to include DWT 510, quantizer 511, and entropy encoder 513 from the FIG. 1 embodiment of encoding system 500. Each of the YUV components 509 are separately provided to a different one of the parallel encoders for concurrent encoding to significantly improve throughput characteristics of the encoding process. Each of the YUV components 509 may then be concurrently output from a respective one of the parallel encoders as encoded data 514.

In the FIG. 11 embodiment, a series of decoders are shown configured in parallel to concurrently decode respective components of encoded data 514. These decoders may be implemented in any appropriate manner. For example, in certain embodiments, each of the parallel decoders may be implemented to include entropy decoder 602, dequantizer 504, and inverse DWT 605 from the FIG. 2 embodiment of decoding system 600. Each of the components of encoded data 514 are separately provided to a different one of the parallel decoders for concurrent decoding to significantly improve throughput characteristics of the decoding process.

Each of decoders may then concurrently output a respective one of the decoded YUV components 606 to a corresponding color converter which converts and combines the YUV components 606 into a composite image (such as a composite RGB image). A frame reconstructor (RECON) may then provide a reconstructed image 612 to any appropriate image destination.

In the FIG. 11 embodiment, the multiple encoder/decoder architecture is shown with a matching number of encoders and decoders. However, in alternate embodiments, encoder/decoder architectures are also contemplated with non-matching numbers of encoders and decoders. For example, a server computer may require a larger number to encoders to efficiently process a large amount of data for use by separate client computers that each require a relatively reduced numbers of decoders.

In addition, multiple encoder/decoder architectures may similarly be utilized to separately encode and/or decode individual images in a parallel manner for utilization by different data destinations. Furthermore, in certain embodiments, an individual encoder or decoder may be implemented with a plurality of entropy encoders that are configured in parallel to support a single encoding system. For example, the encoding system 500 of FIG. 5 and/or the decoding system 600 of FIG. 6 may be implemented with a plurality of appropriate CABAC encoders 516 or CABAC decoders 614 configured in parallel so that other system components need not wait in an idle state for completion of lengthy entropy encoding or decoding procedures.

Figure 12:
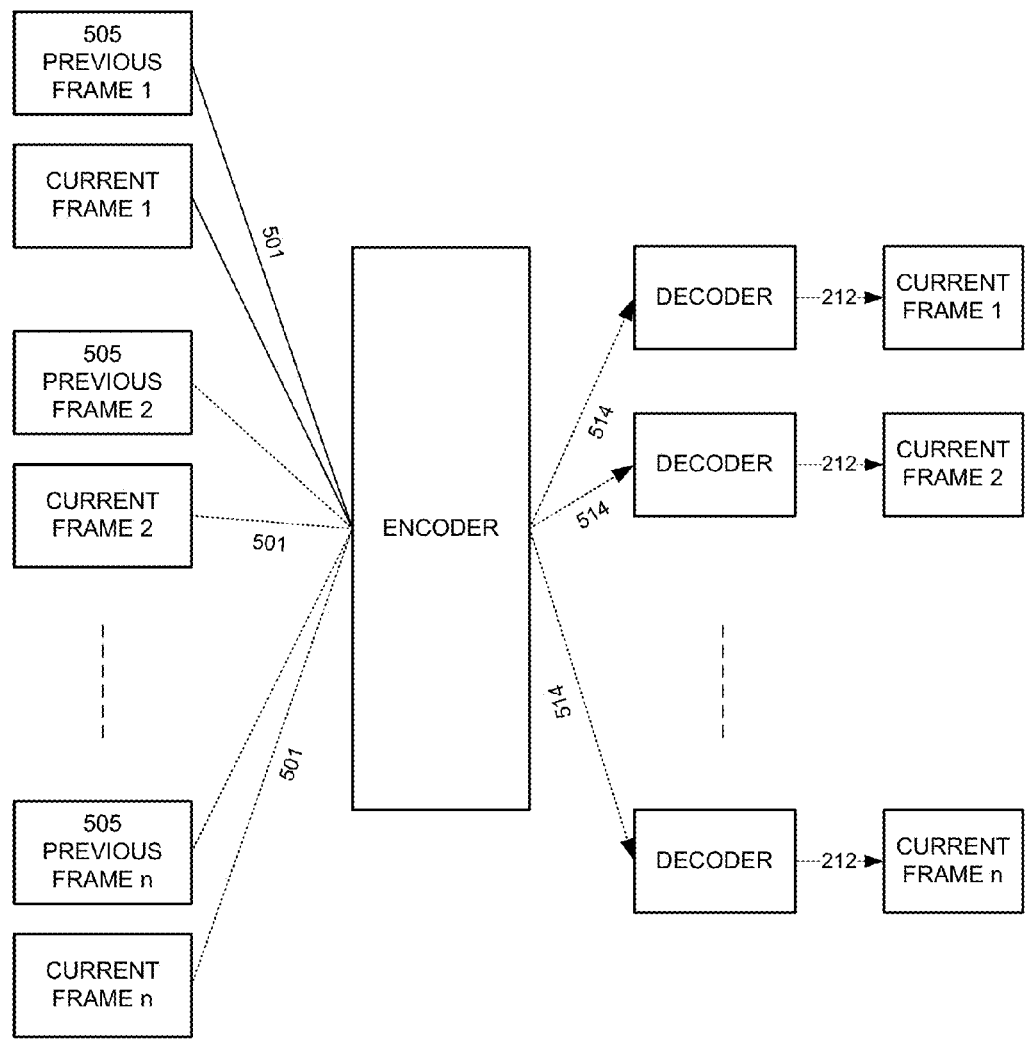
FIG. 12 illustrates one embodiment of a multiple image encoding/decoding procedure.

Referring now to FIG. 12, a block diagram illustrating a multiple image encoding/decoding procedure is shown, in accordance with one embodiment of the present disclosure. In the FIG. 12 embodiment, a single encoder is shown concurrently encoding an image 1 through an image n, and providing the respective encoded images to appropriate decoders. The encoder may be implemented in any effective manner. For example, in certain embodiments, the FIG. 12 encoder may include, but is not limited to, any of the components shown in the encoding system 500 of FIG. 1.

The encoder stores previous frames 1 through n (505) from respective corresponding images. The FIG. 12 encoder also receives current frames 1 through n of source images 501 from any appropriate destination(s). The FIG. 12 encoder then concurrently processes the current frames 501 using any appropriate techniques to generate corresponding encoded data 514. For example, in certain embodiments, the FIG. 12 encoder utilizes encoding techniques that are the same as, or similar to, those encoding techniques discussed above in conjunction with FIGS. 5, 7, and 9.

In the FIG. 12 embodiment, the encoder may then provide the individual frames of encoded data 514 to respective decoders that are configured in parallel to concurrently decode corresponding frames of encoded data 514. These decoders may be implemented in any appropriate manner. For example, in certain embodiments, the FIG. 12 decoders may each include, but are not limited to, any of the components shown in decoding system 600 of FIG. 2.

The FIG. 12 decoders may then concurrently process the encoded data 514 using an appropriate technique to generate corresponding current frames 1 through n of reconstructed images 612. For example, in certain embodiments, the FIG. 12 decoders utilize decoding techniques that are the same as, or similar to, those decoding techniques discussed above in conjunction with FIGS. 6, 8, and 10. In the FIG. 12 embodiment, the reconstructed images 612 may then be provided to any appropriate image destination.

Figure 13:
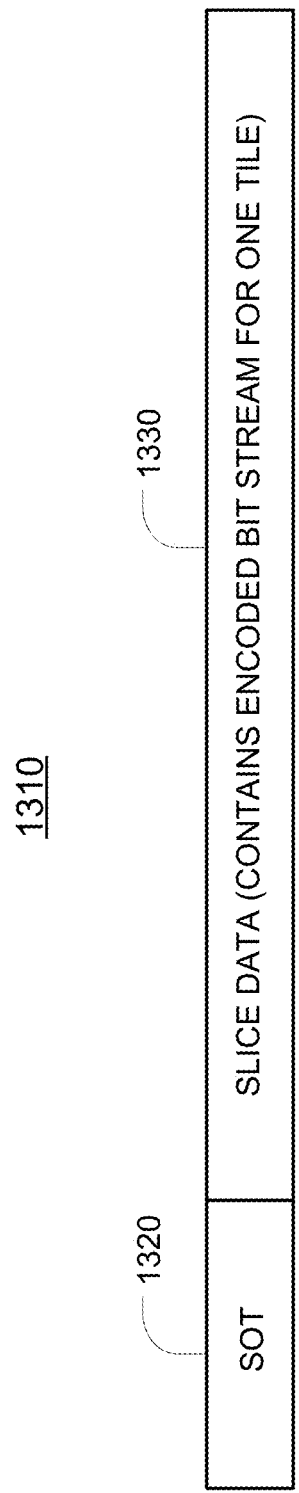
FIG. 13 illustrates one embodiment of tile data.

Referring now to FIG. 13, a diagram for tile data 1310 is shown, in accordance with one embodiment of the present disclosure. In the FIG. 13 embodiment, tile data 1310 includes a Start Of Tile (SOT) header 1320 and slice data 1330. The FIG. 13 embodiment is presented for purposes of illustration, and in alternate embodiments, tile data 1310 may be implemented using components and configurations in addition to, or instead of, certain of those components and configurations discussed in conjunction with the FIG. 13 embodiment.

The FIG. 13 embodiment illustrates the data format for storing or transmitting encoded data 514 for each tile. The start of tile header (SOT) 1320 consists of various different selectable parameters that are used to reconstruct the tile and embed the tile into to a current frame of image data. For example the SOT 1320 may include quantization parameters for various subbands, a length of an associated encoded information, and offset values to facilitate decoding procedures. The SOT 1320 may be followed by the slice data 1330 that may include an encoded bit stream corresponding to one associated tile. In the FIG. 13 embodiment, the slice data may be encoded in any appropriate format. For example, in certain embodiments, slice data may be encoded either by the CABAC encoder 916 or by the RLE encoder 920 discussed above in conjunction with FIG. 9.

Figure 14:
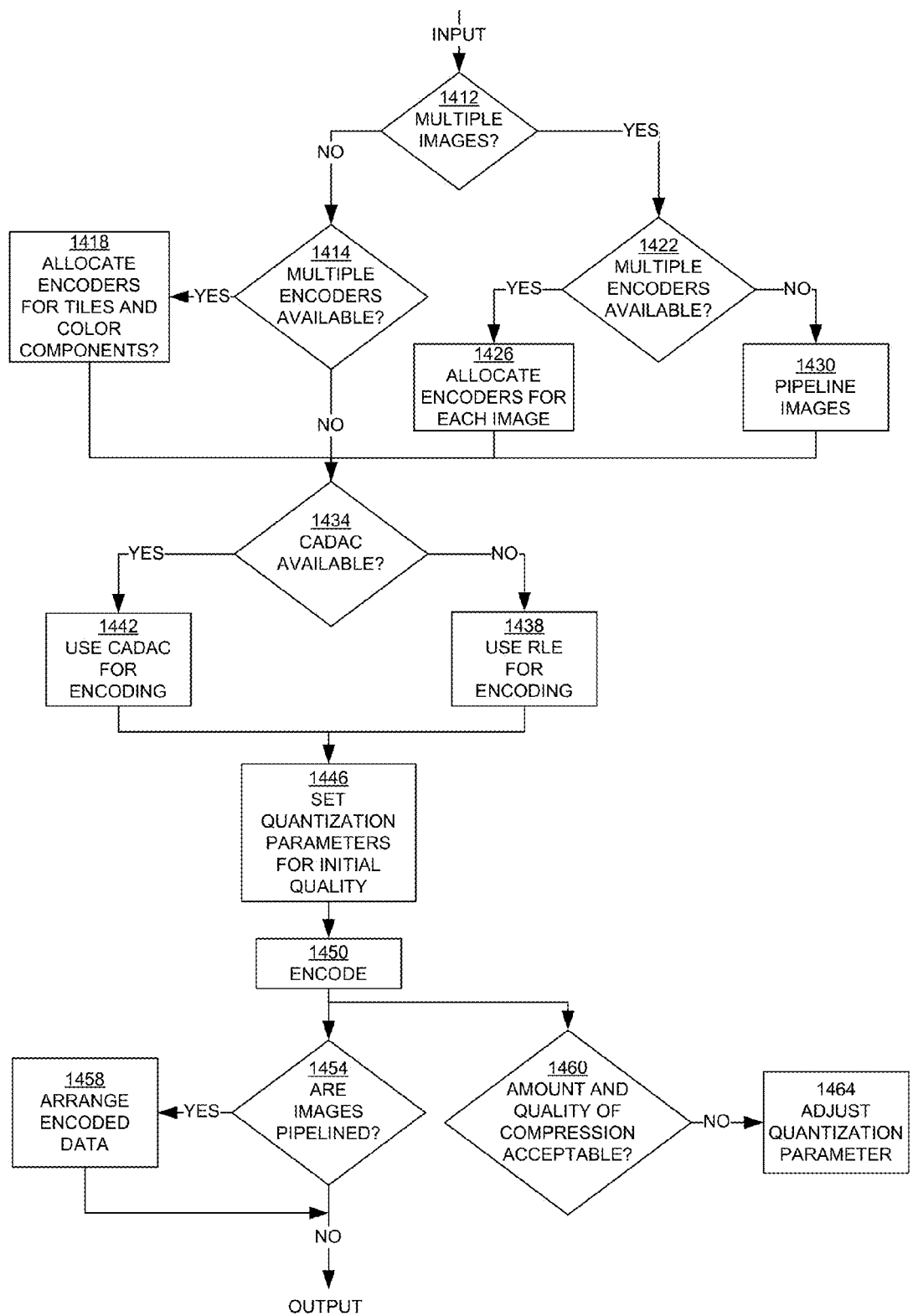
FIG. 14 illustrates a flowchart of operations for performing an encoding procedure.

Referring now to FIG. 14, an exemplary operational procedure for performing an encoding procedure is shown, in accordance with one embodiment of the present disclosure. In the FIG. 14 embodiment, in operation 1412, an encoding system 500 receives input data, and responsively determines whether the input data includes multiple images. If only a single image source is being received, then in operation 1414, encoding system 500 determines whether multiple encoders are available for processing the image. If multiple encoders are available, then in operation 1418, encoding system 500 allocates the encoders to separately and concurrently process the individual tiles of the different color components in a parallel manner.

Alternately, if multiple images are received, then in operation 1422, encoding system 500 determines whether multiple encoders are available for processing the images. If multiple encoders are available, then in operation 1426, encoding system 500 allocates the encoders to separately and concurrently process the multiple images in a parallel manner. If multiple encoders are not available, then in operation 1430, encoding system 500 performs a pipelining procedure for passing the multiple images through the encoding process.

In operation 1434, encoding system 500 determines whether CABAC encoding/decoding is supported. If a CABAC encoding/decoding is available, then in operation 1442, encoding system 500 utilizes the CABAC encoder 916 to perform the entropy encoding procedure. However, if a CABAC encoding/decoding is not available, then in operation 1438, encoding system 500 utilizes a RLE encoder 920 to perform the entropy encoding procedure.

In operation 1446, encoding system 500 sets a quantization parameter at an initial image quality level that corresponds to a particular compression ratio 515 of a quantizer 511 (FIG. 5). Then, in operation 1450, encoding system 500 encodes the image(s) in a pre-determined encoding format. In operation 1454, encoding system 500 determines whether the images are pipelined. If the images are not pipelined, then encoding system 500 outputs the encoded data 514 to an appropriate data destination. Alternately, if the images are pipelined, in operation 1458, encoding system 500 arranges the encoded data 1458 before outputting the encoded data 514 to an appropriate data destination.

In operation 1460, encoding system 500 determines whether the compression amount and quality of the output images are acceptable. If the amount and quality of compression are not acceptable according to pre-defined criteria, then in operation 1464, encoding system 500 dynamically utilizes a feedback loop to adjust the quantization parameter 515 for altering the compression ratio of quantizer 511 to thereby change the amount and quality of the encoding compression.

Figure 15:
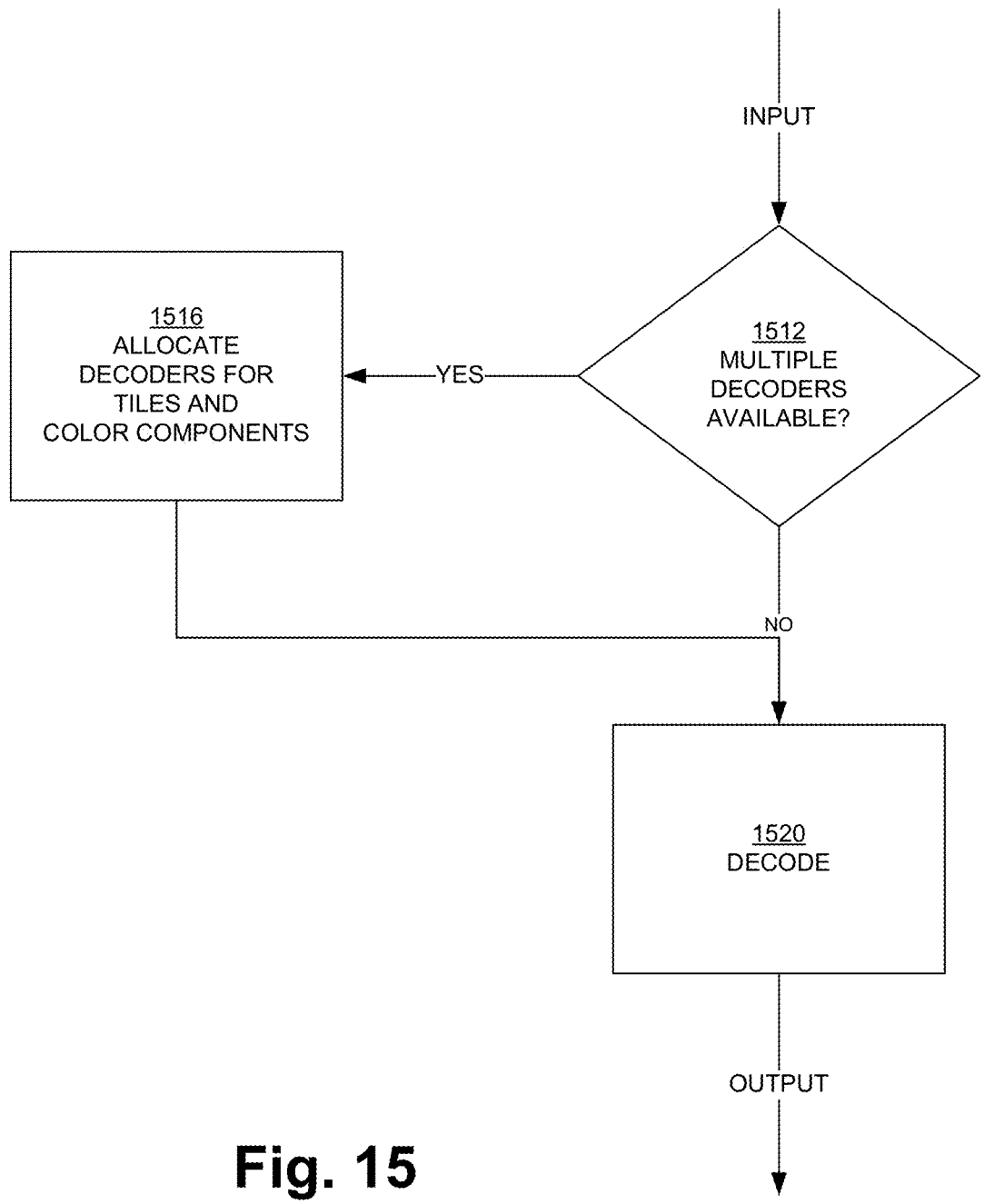
FIG. 15 illustrates a flowchart of operations for performing a decoding procedure.

Referring now to FIG. 15, an exemplary operational procedure for performing a decoding procedure is shown, in accordance with one embodiment of the present disclosure. In the FIG. 15 embodiment, a decoding system 600 initially receives input data in the form of encoded data 914. Then in operation 1512, decoding system 600 determines whether multiple decoders are available for processing the encoded data 514. If multiple encoders are available, then in operation 1516, decoding system 600 allocates the decoders to separately and concurrently process the individual tiles of the different color components in a parallel manner. In operation 1520, decoding system 600 next decodes the image data in a predetermined manner to produce a reconstructed image 612. Decoding system 600 then outputs the reconstructed image 612 to any appropriate data destination(s).

Figure 16:
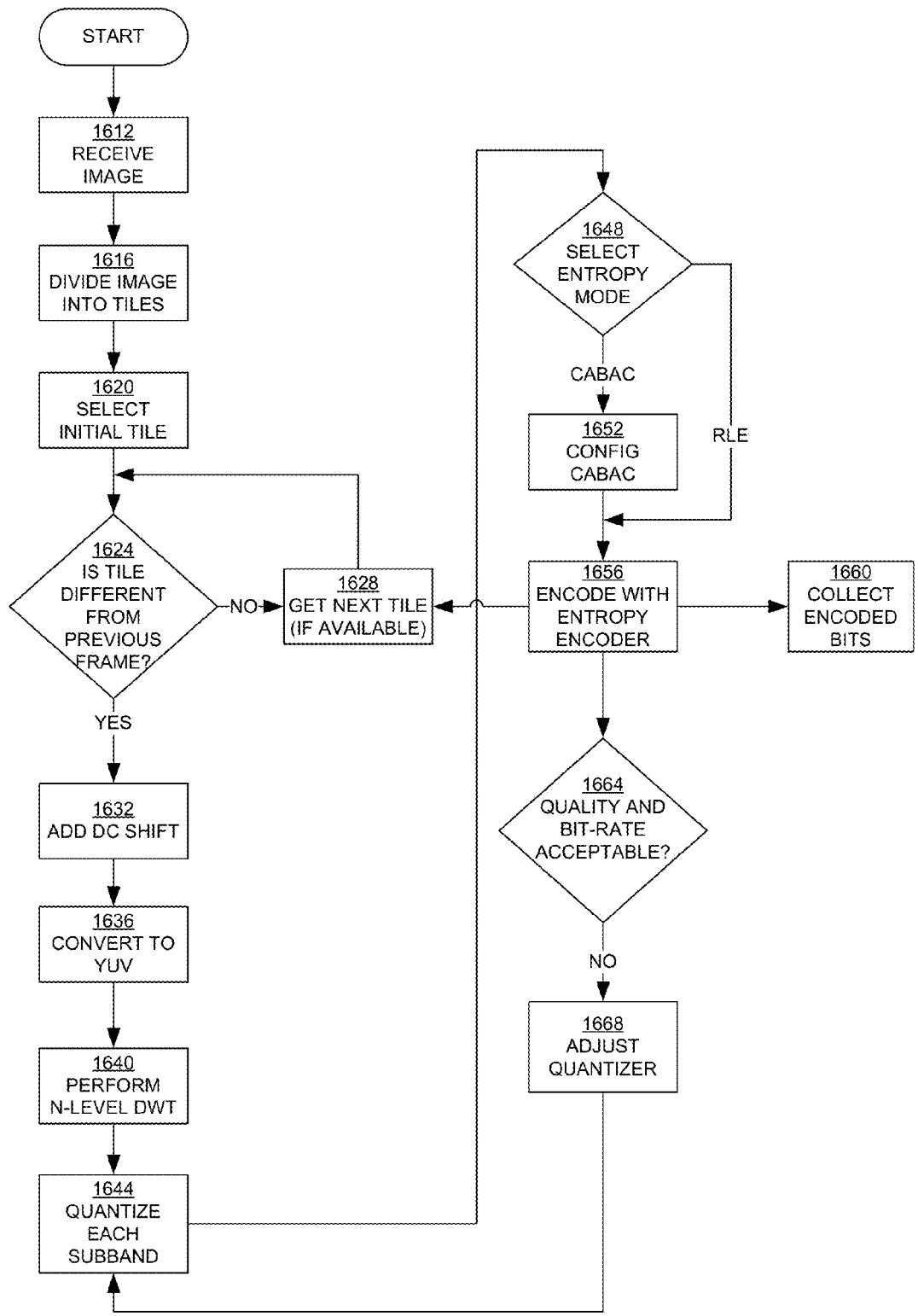
FIG. 16 illustrates flowchart of operations for performing an encoding procedure.

Referring now to FIG. 16, an exemplary operational procedure for performing an encoding procedure is shown, in accordance with one embodiment of the present disclosure. In the FIG. 16 embodiment, in operation 1612, an encoding system 500 initially receives a source image 501 from any appropriate data source. The source image 501 may be configured according to any desired data format. For example, in certain embodiments, the source image 501 may be implemented as an array of digital picture elements (pixels) in a known RGB format. In operation 1616, encoding system 500 utilizes a tiling module 502 to divide the source image 501 into individual tiles that are implemented as contiguous sections of image data from the source image 501.

In operation 1620, encoding system 500 selects a current tile from the source image 501. Then in operation 1624, a frame differencing module 504 compares the current tile to a corresponding comparison tile from a previous frame 505 to determine whether the current tile has been altered with respect to the comparison tile from the immediately preceding frame 505. If the pixels in the current tile have not been altered, then frame differencing module 504 does not output the current tile. Instead, in operation 1628, frame differencing module 504 accesses the next tile (if available) from source image 501, and the FIG. 16 process returns to repeat foregoing operation 1624.

However, in operation 1624, if one or more pixels in the current tile have been altered, then frame differencing module 504 outputs the corresponding tile to a DC shift module 507 that adds a constant DC voltage value to each pixel from the tiles that are output from frame differencing module 504. In operation 1636, a color converter 508 converts each of the altered tiles from a first color format to a second color format that is appropriate for further processing by encoding system 500. For example, in certain embodiments, source image 501 may initially be received in an RGB format which color converter 508 responsively converts into a corresponding YUV format.

In the FIG. 16 embodiment, a discrete wavelet transform module (DWT) 510 performs a known discrete wavelet transform procedure (DWT) to transform the individual color components of the tiles into corresponding color subbands. A quantizer module 511 next performs a quantization procedure by utilizing appropriate quantization techniques to compress the color subbands. Quantizer 511 produces compressed image data 512 by reducing the bit rate of the color subbands according to a particular compression ratio that is specified by an adaptive quantization parameter 515.

In operation 1648, an adaptive entropy selector 512 next selects an appropriate entropy mode (either CABAC mode or RLE mode) for performing an entropy encoding procedure based upon certain pre-determined encoding mode selection criteria. If CABAC mode is selected, then in operation 1652, encoding system 500 advantageously performs a CABAC configuration procedure that defines certain specific configuration parameters for operating a CABAC encoder 516 to optimally process the compressing image data 512 received from quantizer 511.

In operation 1656, an entropy encoder 513 performs an entropy encoding procedure upon the compressed data 512 by utilizing the entropy mode (either CABAC mode or RLE mode) that was selected in foregoing operation 1648. In operation 1660, encoding system 500 may then collect the encoded data 514 for providing to any appropriate data destination(s). At this point, the FIG. 16 process may be repeated for additional tiles by returning to operation 1628, where frame differencing module 504 accesses the next tile from source image 501 (if any unprocessed tiles remain).

In operation 1664, encoding system 500 may further perform a bit-rate control procedure by initially determining whether the quality and bit-rate of encoded data 514 are acceptable in light of one or more pre-defined image assessment criteria. In operation 1664, if encoding system 500 determines that the quality and bit-rate of encoded data 514 are not acceptable, then in operation 1668, a bit rate controller of entropy encoder 513 provides an adaptive quantization parameter 515 via a feedback loop to quantizer 511 to alter the bit rate of compressed image data 514 according to a particular compression ratio that is specified by the adaptive quantization parameter 515.

As described above, a graphics bitmap may be divided into tiles. Furthermore, when a tile is sent from the server to the client, the tile data may be encoded to reduce the amount of data sent over the network. It can be seen that the encoding/decoding process involves a series of operations that are preferably performed at a rate that supports the continuous reception/capture of frames and generation of graphics on the client side such that the user can be provided a high quality and timely display experience. Some of the described encoding/decoding operations may be performed on the entire tile, e.g. discrete wavelet transformation and quantization. The discrete wavelet transformation process involves repeated operations and feeding the results of one stage into the next stage.

For example, a 128×128 tile may be transformed into four 64×64 subtiles that may represent combinations of high and/or low frequency components or subbands. Each of these four subtiles may then be transformed into four 32×32 subtiles, each of which may then be transformed into four 16×16 subtiles. At each intermediate level, it is preferable that the output of one stage be immediately fed into the next stage without the need to store the result. Each of the resulting subtiles may then be directly quantized and entropy encoded. In a hardware implementation, such operations may be performed efficiently and quickly. In general, however, entropy encoding, which is typically at the last stage of the encoding process described above, is slower in throughput and may be more processor intensive. Furthermore, processing requirements tend to increase as a function of the magnitude of the data coefficients produced during the encoding phase. It is desirable to preserve the coefficient values without any loss of fidelity. However, the storing of intermediate values is not desired because of the time required to perform I/O operations and the amount of memory required. The entire intermediate result would need to be stored before proceeding to the succeeding processing stage, which may result in performance penalties due to the movement into and out of memory as well as the number of processing cycles needed.

Accordingly, the above algorithms may be adapted such that the tiles or subtiles are divided into two or more segments that may be independently processed. In various embodiments, the segments may comprise "slices" of the tile or subtile. In one embodiment, a tile or subtile may be logically divided into four slices of equal size. Each slice of the tile data may then be independently and/or concurrently processed. Depending on the specific format used, the slicing process may be performed for each image component. For example, if a YUV format is used, then the slicing process may be performed for each of the three YUV components or their transformed subtiles.

The processing may further be implemented in software, custom hardware, or both. When the slice processing is implemented in software, the programming may utilize the multi-core CPUs that are typically used in many computing systems. The program may be thus be written such that each core processes a slice of the tile data. If a tile is divided into four slices and the slices are processed on four CPU cores, the total processing time can be reduced to about a quarter of the time it would take to process the entire tile without slicing.

When the slice processing is implemented in hardware, the hardware may be designed to instantiate 1, 2 or 4 or more instances of a slice processing engine. In an embodiment, the slice processing engine may implement an encoder slice engine that performs entropy encoding on a slice of tile data. An arbiter function may also be provided that collects the data from a prior stage, logically divide the data into slices, and distribute the data slices to the slice engines.

On the client side, one or more decoder slice engines may perform the reverse of entropy encoding on a receive slice of encoded tile data. The output of each decoder slice engine may then be combined and then passed to the next processing stage which may process the combined data tile. For example, four entropy decoder slice engines may receive four slices for concurrent processing. The output of each concurrent process may then be logically combined and passed to the de-quantization phase.

As mentioned, the data slices are independent and may be processed independently. In an embodiment, each slice may be associated with different areas of memory. Because the output of a compression stage requires variable storage space, it may not be possible to plan in advance the amount of memory that should be reserved for a process. The data may thus be placed into different areas of memory during processing. Upon completion of processing, the processed slices may be concatenated to produce the complete result.

The preferred number of slices may be determined according to the specific needs of the system and the processing techniques used. A trade off can be determined between the number of processors and the size of the data. For example, if the tile size is 128×128 and a discrete wavelet transformation is used, 16×16 subtiles will be produced after three intermediate stages. The 16×16 subtile may then be divided into four 16×4 slices that may be processed by four slice engines. Using two slice engines with 16×8 slices will not likely provide the improvement in throughput that is desired, and eight slices with 16×2 slices will not likely provide an efficient balance between the increased number of processes and a notable improvement in throughput.

While the tile slicing procedure has been described in terms of a process that utilizes discrete wavelet transformation, quantization, and entropy encoding, the concept can be readily applied to various compression/encoding processes that may involve one ore more types of data transformation, quantization and encoding processes.

Figure 17:
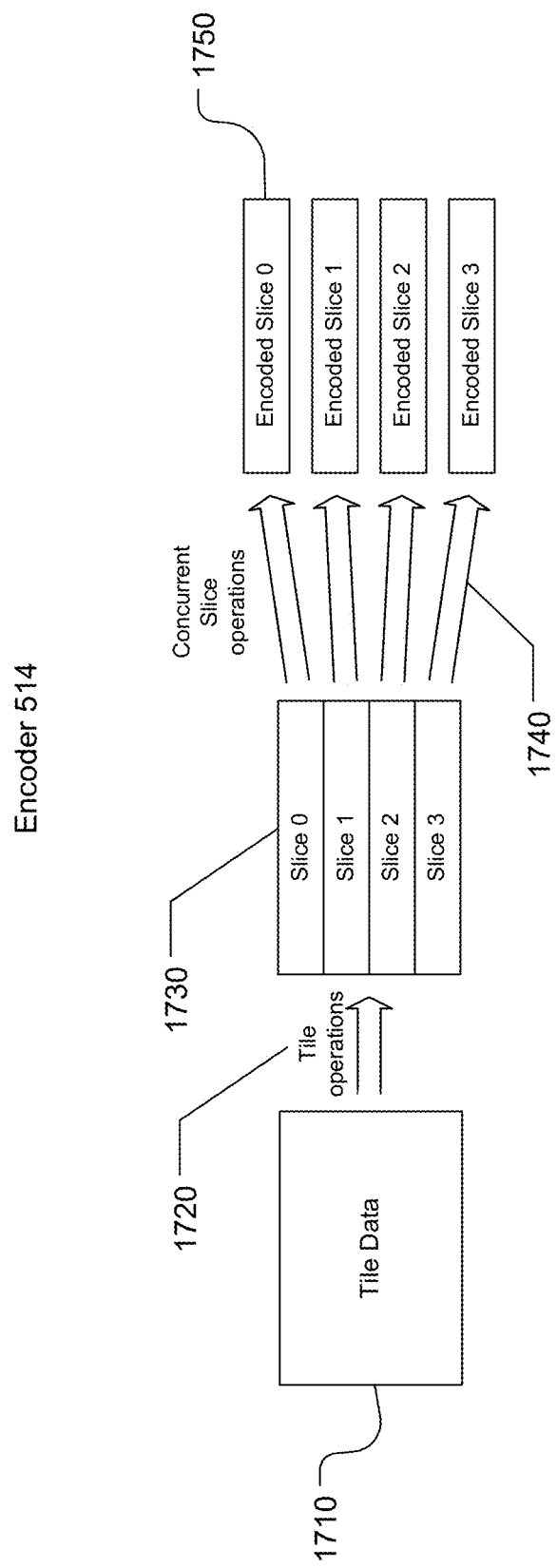
FIG. 17 illustrates an embodiment of a data tile slice encoding procedure.

Referring to FIG. 17, illustrated is an example embodiment of a sliced tile encoding mechanism. Tile data 1710 may comprise a tile comprising bitmap data representing a portion of a virtual machine user display to be transmitted to a client device. Tile operations 1720 may represent various operations described above for processing the received data tiles. The operations may further include processes for dividing the tile into two or more slices. In the example shown, the tile data 1710 is divided into four slices 1730 for concurrent processing 1740. In an embodiment the four slices may be logical slices that divide the tile data 1710 into four equal size slices. For example, a 16×16 tile may be divided into four 4×16 slices.

The slices 1730 may be further processed to generate processed slices 1750. As discussed above, the process may include encoding techniques such as entropy encoding. The processed slices 1750 may then be transmitted to a client computer for decoding. The slices may be transmitted over any type of network protocol and over wired or wireless networks.

Figure 18:
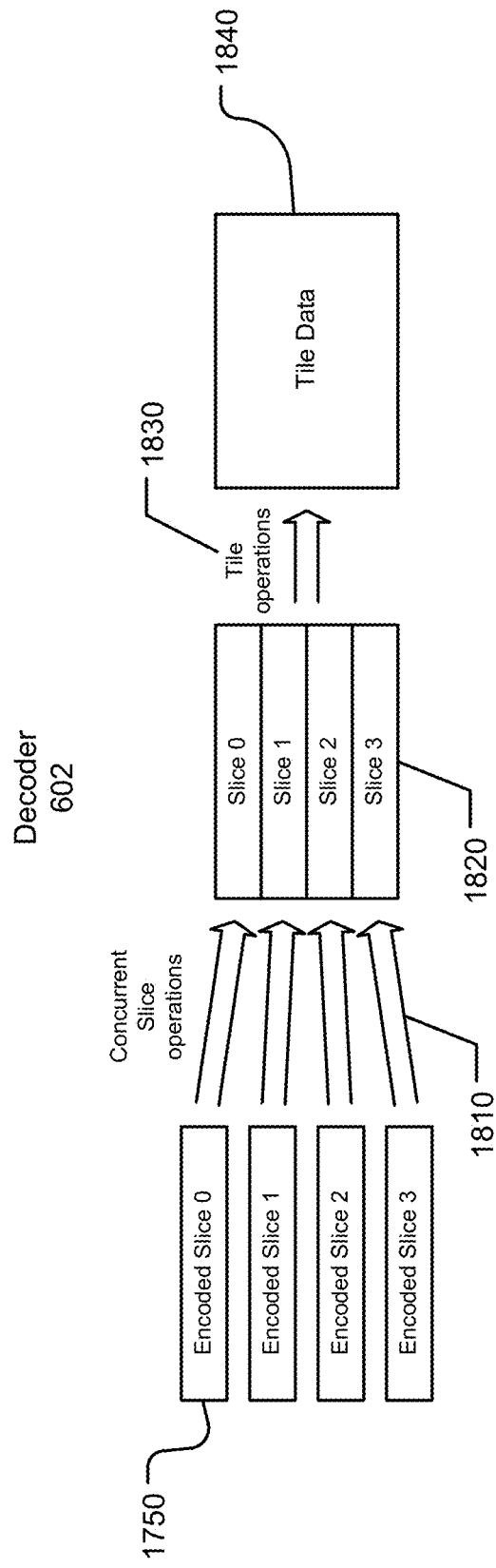
FIG. 18 illustrates one embodiment of a data tile slice decoding procedure.

Referring to FIG. 18, the processed slices 1750 may be received by a decoder 602 on the client computer. The slices 1750 may then be processed concurrently 1810. For example, the slices may be decoded using a reverse entropy decoding technique to recover the original data slices 1820. The decoded slices may further be concatenated and further processed 1830 using, for example, dequantization and inverse transform operations. The original data tile 1840 may thus be re-generated.

Frame Capture and Processing

In various methods and systems disclosed herein, improvements to the processing and handling of the various processes described above may be used to provide more efficient processing and thus a more timely and rich user experience. The methods and systems also provide for improvements in providing such graphics support when the network and/or system resources become congested or otherwise less available. The embodiments disclosed herein for rendering, encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

Figure 19:
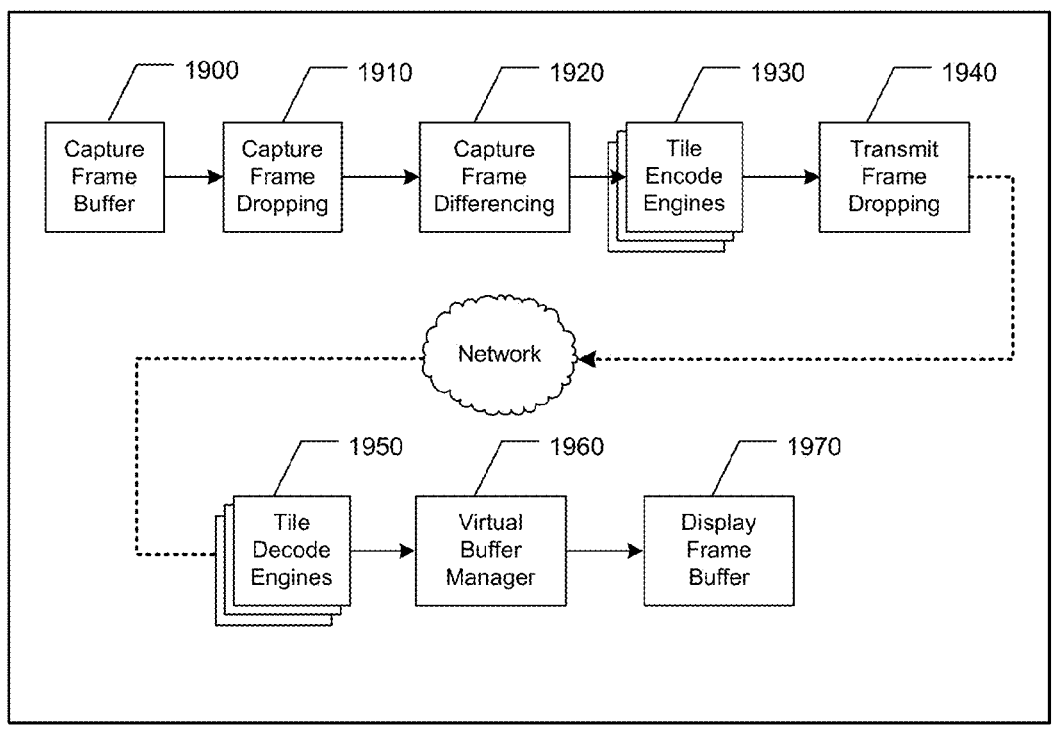
FIG. 19 illustrates an overview of some of the processes disclosed herein.

Referring to FIG. 19, illustrated is an overview of various functions associated with the rendering and encoding processes discussed herein. Various aspects of the illustrated process may be modified to improve the throughput and efficiency of the processes. Process 1900 illustrates the capturing and buffering of a client frame. Process 1910 illustrates that under certain circumstances it may be advantageous to drop a captured frame. The term dropping may include ignoring the captured data in favor of the next captured frame data, clearing the buffers of the captured data, and the like. Process 1920 illustrates that the captured frame may be analyzed to determine if differences exist compared to the previously captured frame. Process 1930 illustrates the process of encoding the changed tiles of a frame. Process 1940 illustrates that under certain circumstances it may be advantageous to drop a frame that has been encoded and is ready to transmit. The term dropping may include ignoring the encoded data in favor of the next encoded frame, clearing the transmit buffers of the encoded data, and the like. Once transmitted, process 1950 illustrates that the received tiles may be decoded. Process 1960 illustrates that the receive buffers may be managed to track changed tiles. Process 1970 illustrates that the display frame buffers may be used to drive the display controller in an efficient manner. Various aspects of the above processes are further detailed below.

Figure 20:
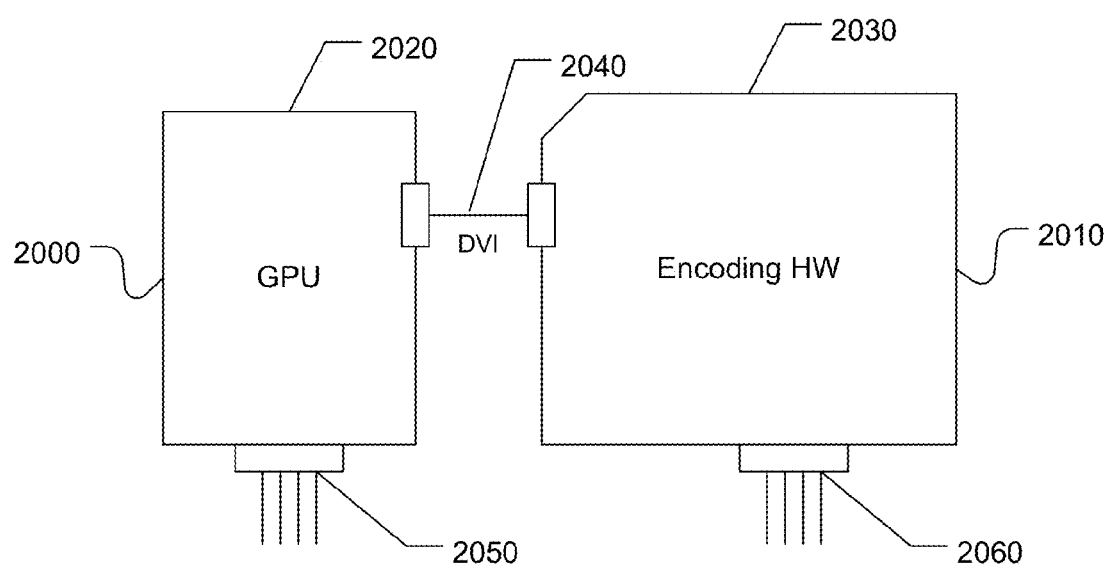
FIG. 20 illustrates an exemplary diagram of a GPU and encoding hardware.

Rendering of client frame graphics data may be performed on the system's central processing unit, (CPU), a specialized graphics processing unit (GPU), or custom hardware. If the rendering is performed on a CPU, the rendered graphics may be transferred to the encoding system through a PCI-Express interface. If the rendering is performed on the GPU, the graphics data may be transferred through a video link such as a DVI interface if provided. In this manner memory access may be avoided, thus providing improved speed of operation. Alternatively, if rendering is done in the custom hardware, for example using an on-chip 2D engine, transferring of the data may be unnecessary. For example, referring to FIG. 20, a GPU 2000 may communicate with encoding hardware 2010 to transmit rendered graphics data for encoding. Rather than transferring data through connector 2050 to transmit over a system bus to connector 2060 of encoding hardware 2010, the GPU 2000 may directly communicate with the encoding hardware 2010 via a DVI connection 2040.

Figure 21:
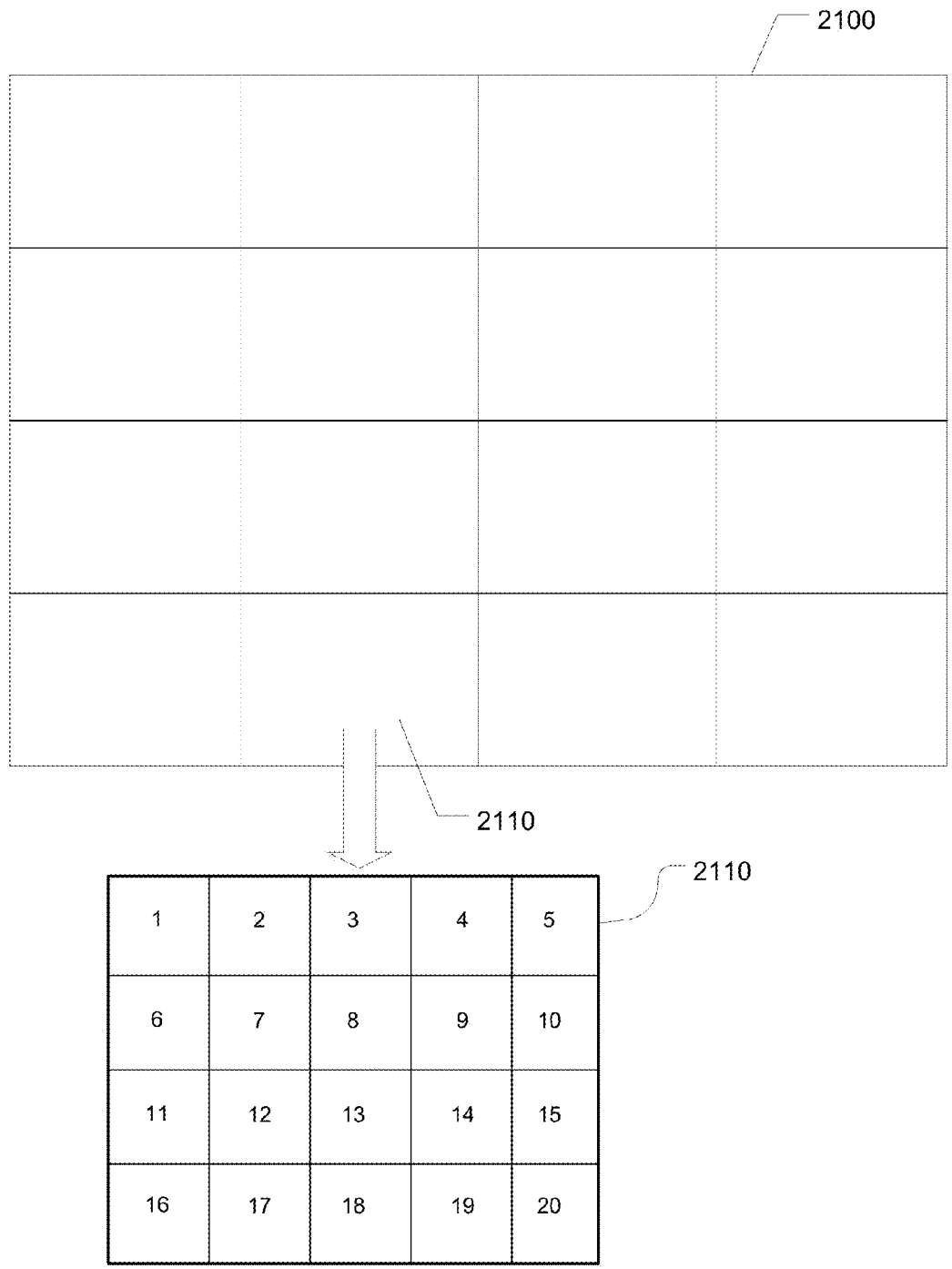
FIG. 21 illustrates an exemplary diagram of a virtual screen comprised of individual screens.

As discussed above, a video frame may be logically partitioned into a plurality of smaller tiles. If rendering is performed on a GPU, the client screen data may be arranged using a variety of schemes. In one embodiment, a virtual frame mode may be used wherein multiple client screens are spatially composed within a single virtual screen. This embodiment can be conceptualized as one large screen comprised of multiple client sessions. In this embodiment all clients may have the same update/refresh rate. Each frame may be captured, however only the changed tiles may be processed according to the processes disclosed above. For example, referring to FIG. 21, a virtual frame 2100 to be transmitted to the encoding system may comprise sixteen client frames. An exemplary client screen 2110 may further be divided into twenty tiles and encoded using the techniques described herein.

Figure 22:
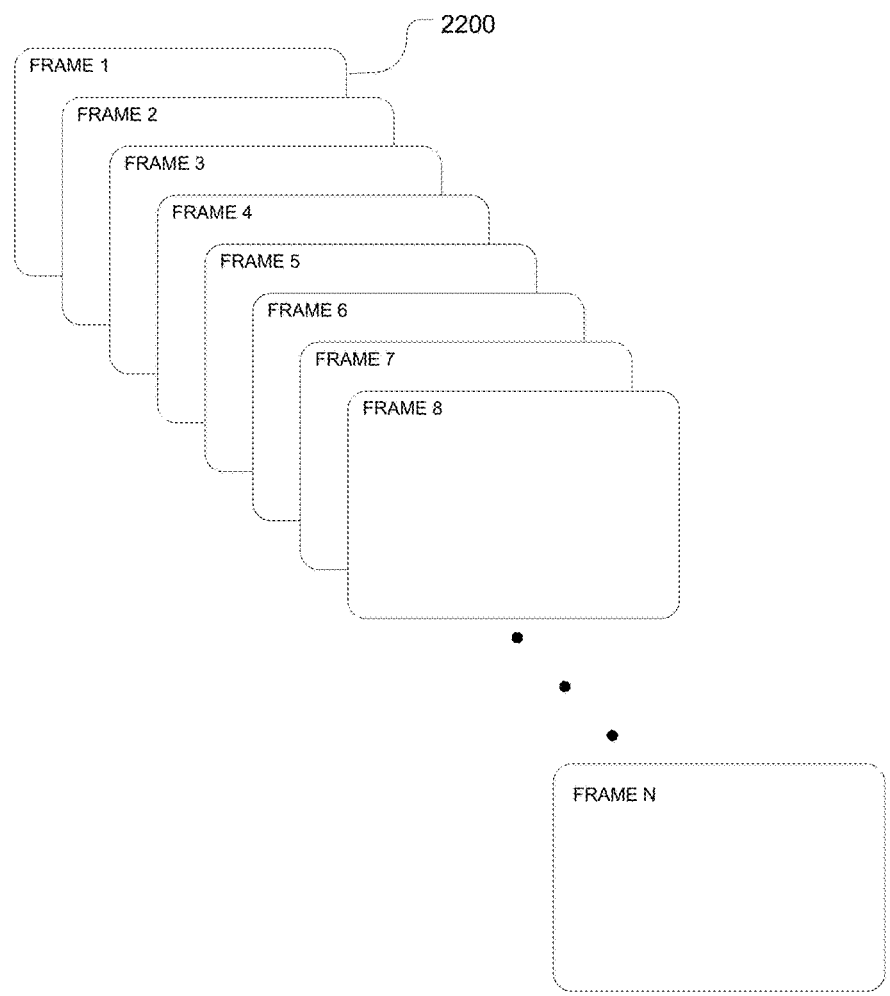
FIG. 22 illustrates an exemplary diagram of a temporal frame mode.
Figure 23:
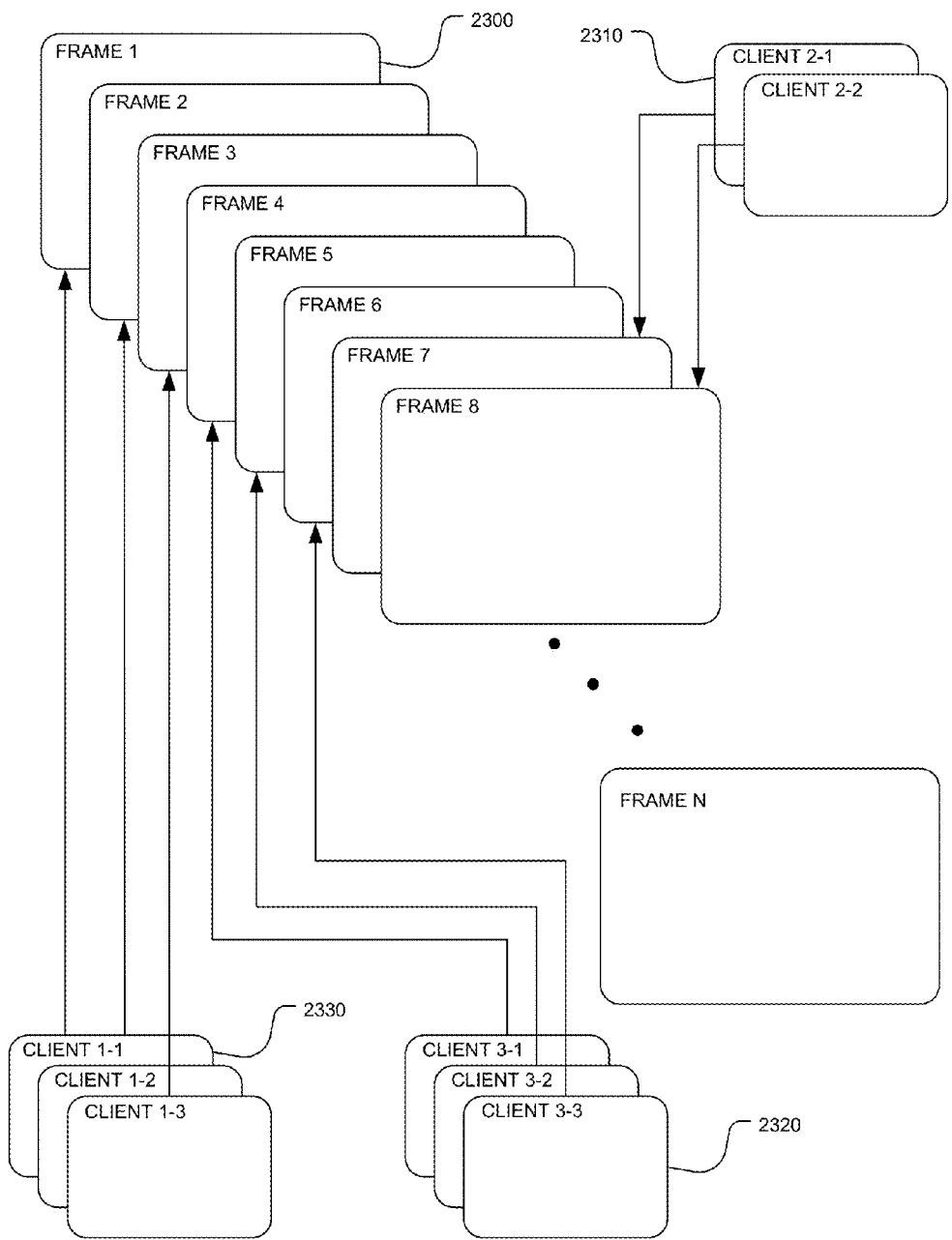
FIG. 23 illustrates an exemplary diagram of a temporal frame mode.

In another embodiment, a temporal frame mode may be provided in which each client frame will occupy one time slot of the server frame sequence and one frame is provided to the encoding engine at a time. In this embodiment, each client may have its own update/refresh rate. Each screen may further be embedded with information describing which client the frame is destined for. For example, a client with minimal updates may be relatively idle and may only need a low refresh rate. Clients with high update rates, for example a client playing a video, may be captured by being provided more time slots. For example, referring to FIG. 22, each of frames 2200 may represent a single capture frame of a plurality of capture frames. The individual frames may be apportioned to various clients in order to support refresh rates supporting the type and nature of the client activity. Referring to FIG. 23, the individual frames of frame sequence 2300 may be apportioned between frames for client 1 2330, client 2 2310, and client 3 2320. For example, frames 1-1, 1-2, and 1-3 of client 1 2330 may be assigned to frames 1, 2, and 3 of frame sequence 2300. Frames 2-1 and 2-2 of client 2 2310 may be assigned to frames 7 and 8 of frame sequence 2300. Finally, frames 3-1, 3-2, and 3-3 of client 3 2320 may be assigned to frames 4, 5, and 6 of frame sequence 2300.

Various methods may be used to identify the correct client destination for each transmitted frame. For example, additional lines may be added to the top of a frame as information for client identification.

Figure 24:
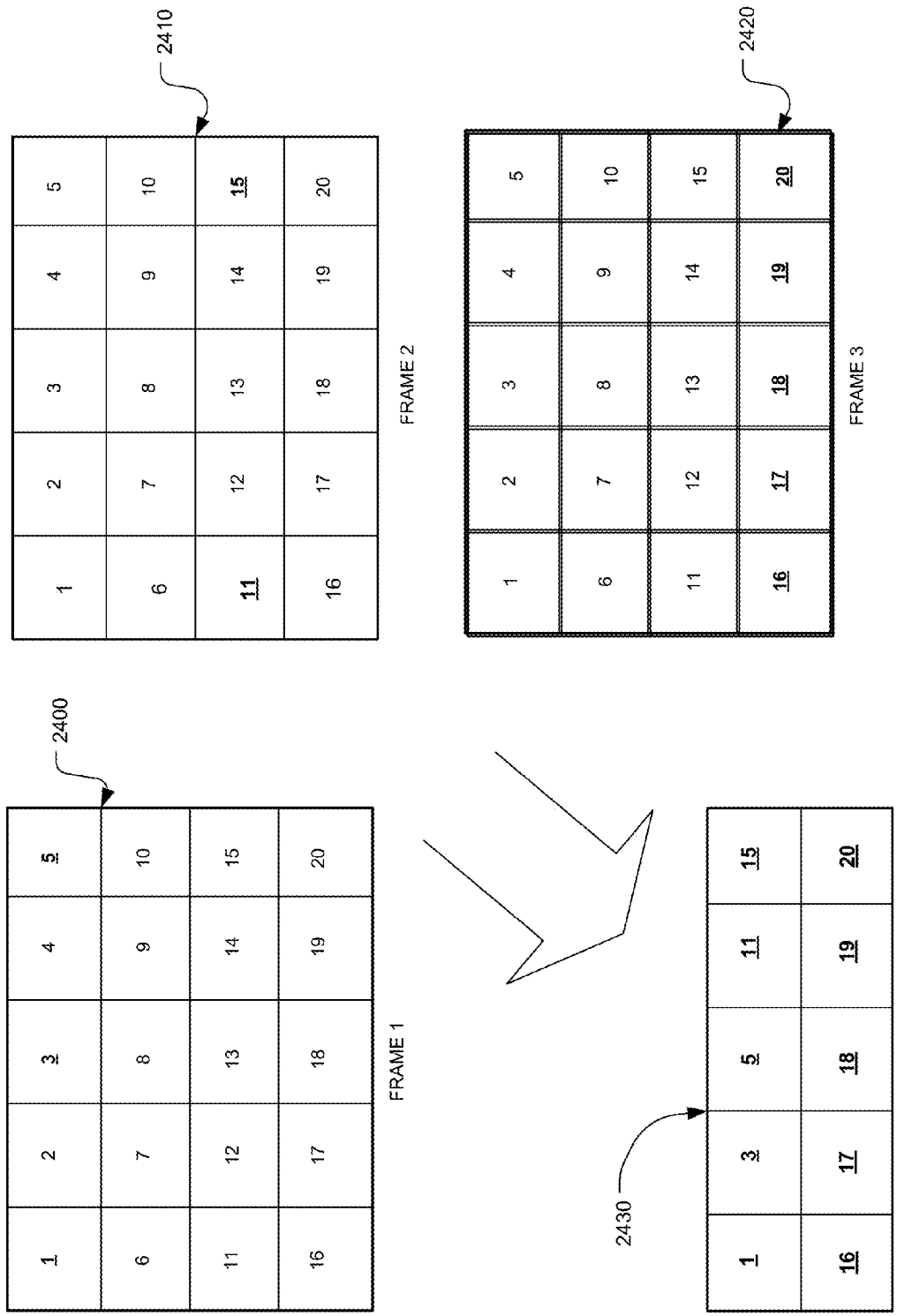
FIG. 24 illustrates an exemplary diagram of a changed tile mode.

In another embodiment, a changed-tile mode may be provided that tracks which tiles have changed and providing only the changed tiles to the encoding engine for processing. For example, the CPU may keep track of which tiles are changed, and only the changed tiles may be provided for further processing. For example, 4×5 tiles may be implemented for a screen. In this embodiment, only tiles that changed may be transferred for that screen. Referring to FIG. 24, frame 1 2400 may include three changed tiles 1,3 and 5 (emphasized by bolded and underlined tile numbers). Frame 2 2410 may include two changed tiles 11 and 15. Frame 3 2420 may include five changed tiles 16, 17, 18, 19 and 20. The resulting sequence of tiles 2430 sent to the encoding system may include the set of changed tiles from the three frames, including tiles 1, 3, 5, 11, 15, 16, 17, 18, 19, and 20.

Various methods may be used to transfer the changed tiles. For example, the changed tiles may be bit block transferred to the display frame and sent across the link to the encoding engine. In this fashion, changed tiles from multiple clients can be included within a server display frame. The tiles may further be embedded with information on which client the tile belongs. In an embodiment, the first tile row may be used to provide information about the rest of the tiles such as client association, frame number, tile offset, and the like.

Figure 25:
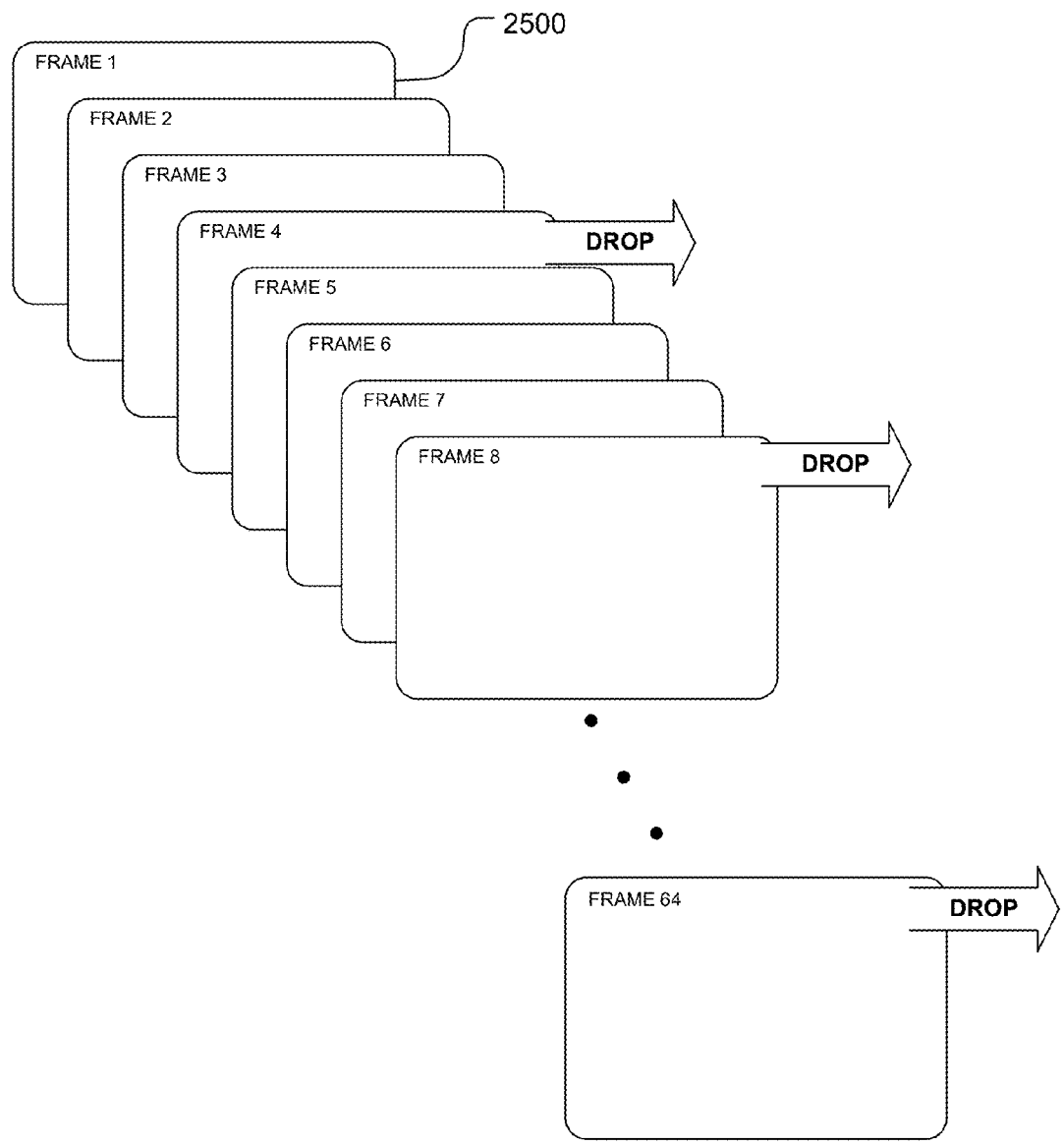
FIG. 25 illustrates an exemplary diagram of a capture frame reprogramming procedure.

In some embodiments, the capture rate of the graphics source data may be adjusted in response to current system and network limitations. For example, during the course of a remote desktop applications, encoded data queued for transmission may be delayed due to network congestion. The continued queuing and delay of the transmissions may result in data being lost when the transmit buffers become full and new data is not stored. Likewise, if the new data is not merged with existing data, the new data may be lost and the queued data, once transmitted, may be stale due to the transmit delay. When a new frame is transmitted after one or more frames have been lost due to the network congestion, the result may be a jerky or otherwise poor quality video on the client side. In one embodiment, a virtual frame mode may be provided, wherein the video capture logic can be programmed to capture a fraction of the incoming frames. In an embodiment, the capture frame can be divided into 1/64 increments. For example, if the system determines that the network is congested and data may be lost, the capture rate can be programmed to capture 3 out of every 4 frames. Accordingly, every fourth frame may be dropped or skipped (i.e., frame 4, 8, 16, and so on). Since the current network and system resources are such that not every frame is able to be captured, the system may more efficiently utilize resources by adjusting the capture rate as a function of the current system and network conditions. Referring to FIG. 25, illustrated is an exemplary sequence of capture frames 2500. If the system determines that network congestion is preventing the transmission of every frame, the system may adjust the capture rate such that 3 out of every 4 frames should be captured. Accordingly, as shown, frames 4, 8 and so on through frame 64 may be dropped.

When the encoding processing cannot keep up with the capture rate, the incoming frame may be written over the current captured data. When such overwriting is repeated, indicating a network or processing issue, the process may be configured to re-program the capture rate to a slower rate.

In some embodiments, improvements in frame processing and encoding can be provided by more efficiently performing captured frame differencing to determine if a frame has changed since the previous frame. While hardware logic may be used to determine whether tiles between the current frame and previous frame have changed, the disclosed methods may be implemented in software. In an embodiment, a CRC value of a tile may be stored as a reference for comparison, in lieu of directly comparing the actual tile data. By calculating the CRC, the result can be quickly compared to the stored CRC to determine if there any differences in the data. The changed tiles may then be compressed and encoded. In embodiments where only changed tiles are compressed/encoded, all changed tiles may be received for compressed/encoded. However, while encoding, the CRC may be calculated to see if the tile has changed. If the tile has not changed, then the tile may not be transmitted.

As noted above, a heavily loaded network or slow processing client may result in loss of data because queued data may not be timely transmitted. In such cases, the process may allow the capture and encoding process to continue such that currently queued data is overwritten or otherwise "dropped." In an embodiment, newly encoded tiles may replace stale unsent tiles in system memory. This process may be repeated for additional tiles while the network backlog situation continues. Since the system resources are such that it may not be possible to transmit every frame, the system may more efficiently utilize resources by adjusting the capture rate as a function of the current system and network conditions while at the same time accumulating the changes indicated by the video data. Once the network is available and the data can be transmitted, the latest encoded set of tiles may be transmitted across the network to the client. The net effect on the client side is that some frames may be skipped. However, the resulting display will typically provide a better response compared to current approaches where the most recent changes are dropped because the earlier frames have not yet been transmitted and remain in the queue.

Figure 26:
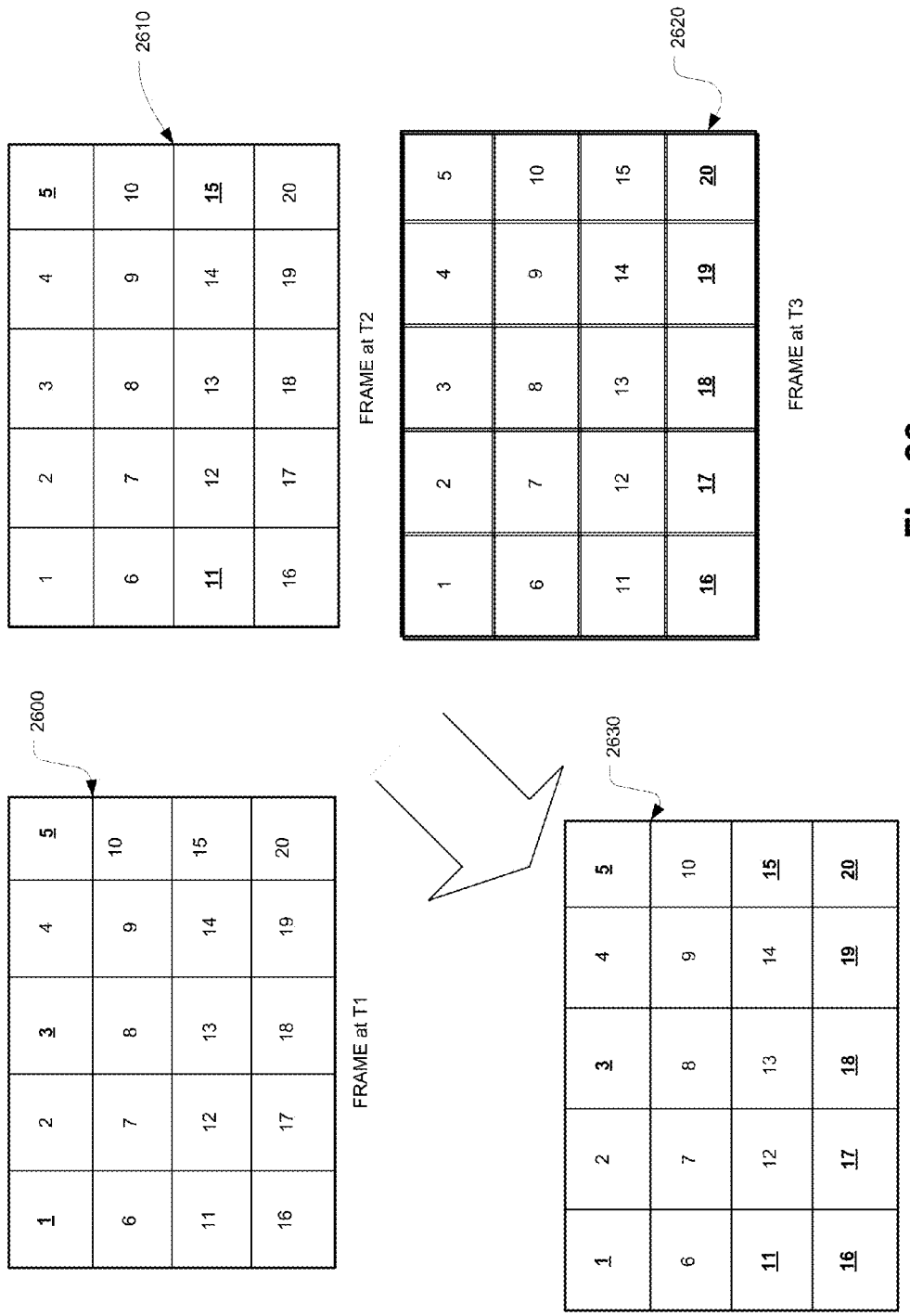
FIG. 26 illustrates an exemplary diagram illustrating the accumulation of changed tiles when dropping transmit frames.

For example, referring to FIG. 26, a frame 2600 comprising 20 tiles may include three changed tiles 1, 3, and 5 during time T1 that are encoded and queued for transmission. Because of network congestion, the currently pending frame is not transmitted, thus being overwritten by frame 2610 at time T2. At T2 only frames 5, 11, and 15 have changed. The current tile 5 from time T2 will overwrite the currently queued tile 5 from T1. Tiles 11 and 15 have not previously changed, and the tiles from T2 are now queued for transmission, along with tiles 1 and 3 from time T1. If network congestion continues, then at time T3 a newly captured frame 2620 results in tiles 16, 17, 18, 19, and 20 being encoded as changed tiles. The resulting data awaiting transmission at time T3 is depicted by frame 2630 which indicates the accumulated changed tiles 1, 3, 5, 11, 15, 16, 17, 18, 19, and 20.

Frame Buffer Management

On the client side, various methods may be used to improve the decoding and rendering of the received encoded data. A client device may use two buffers for receiving and rendering graphics. By using two buffers the delay or flicker caused by the delay in input/output operations that may result from using a single buffer may be reduced. As one buffer is being decoded, newly received encoded data may be stored in the second buffer. When a rendering operation is complete, the entire buffer may be copied into the video memory. Similarly, two graphics pages in video RAM may be used. While one page is actively being displayed, the other page may be rendered. When rendering is complete, the roles of the two pages may be switched, so that the previously displayed page is now being rendered and the previously rendered page is now being displayed. The currently displayed buffer may be called the front buffer, while the page being rendered may be called the back buffer. As discussed above, in some of the embodiments disclosed herein, only changed tiles may be transmitted to the client. Since only changed tiles may be written in the receive buffer, the unchanged tiles will need to be transferred from the active buffer in order to provide a frame with the latest and complete state of a frame. Otherwise, image tearing and other undesired effects may result. Image tearing may occur when a newly rendered frame overlaps a previously rendered frame, creating a discontinuous image when two parts of a rendered object do not line up. Such tearing may be more pronounced during active video imaging such as action movies or video games. While the frame buffers may be copied over in order to provide a fully updated frame for decoding, such a process requires memory read/write cycles that introduce additional processing delays. In order to more efficiently support the client side decoding process and to avoid continuous buffer memory read/write to account for the unchanged tiles, virtual frame buffers and buffer management may be used.

In one embodiment, a tile change list buffer may be used to keep track of which tiles changed within a decoded frame. For example, each cell of a tile change list buffer may contain the frame number and may only be updated when a tile is received from the encoder. The frame number may be used as a base pointer for a particular frame buffer. When a frame is decoded, the contents of the tile change list buffer may be copied from the current tile change list buffer to the subsequent buffer. By tracking the changes rather than the actual data, the memory traffic may be reduced because the unchanged tile data does not have to be copied from frame to frame.

In an embodiment, virtual display frame buffers and buffer management may be used to drive the display controller when retrieving the display frame buffer. In one embodiment, four physical frame buffers may be used. The display frame buffer may retrieve tiles from across the four physical frame buffers, and a list may be maintained keeping track of which buffer contains the most recently received/changed tiles. Memory addresses may be calculated on the fly as a function of the tile change list information. The screen to be rendered may be mapped and the buffer that stores the latest tile for a given tile location can be identified.

The frame buffer management function may be implemented in software or hardware or both. In some embodiments the frame buffer management function may be implemented primarily in hardware to provide speed advantages. In an embodiment, such a frame buffer management function may be implemented on a thin client device in order to provide efficient remote display rendering of screen frames generated at a server device. A thin client may be a client computer or client software in client-server networks which depends primarily on the central server for processing activities, and mainly focuses on rendering input and output between the user and the server.

The number of frame buffers may vary depending on the implementer's design goals. In some embodiments four frame buffers may be used. The above methods may be transparent to the encoding/transmitting server, which can use one or more of the above encoding methods to encode data and transmit the data using protocols such as RDP and/or extensions to such protocols. For example, the above described slicing technique may be used to encode the bitmap data, and the client may receive the slice data and decode the data using the concurrent decoding operations disclosed herein. The decoded frame data may then represent tiles that have changed for the current frame, and the tiles may be placed in a frame buffer. The frame buffer management function may track the received tiles, associate the tiles with the frame tracking identification, and the rendering system may retrieve the appropriate tiles when needed.

Figure 27:
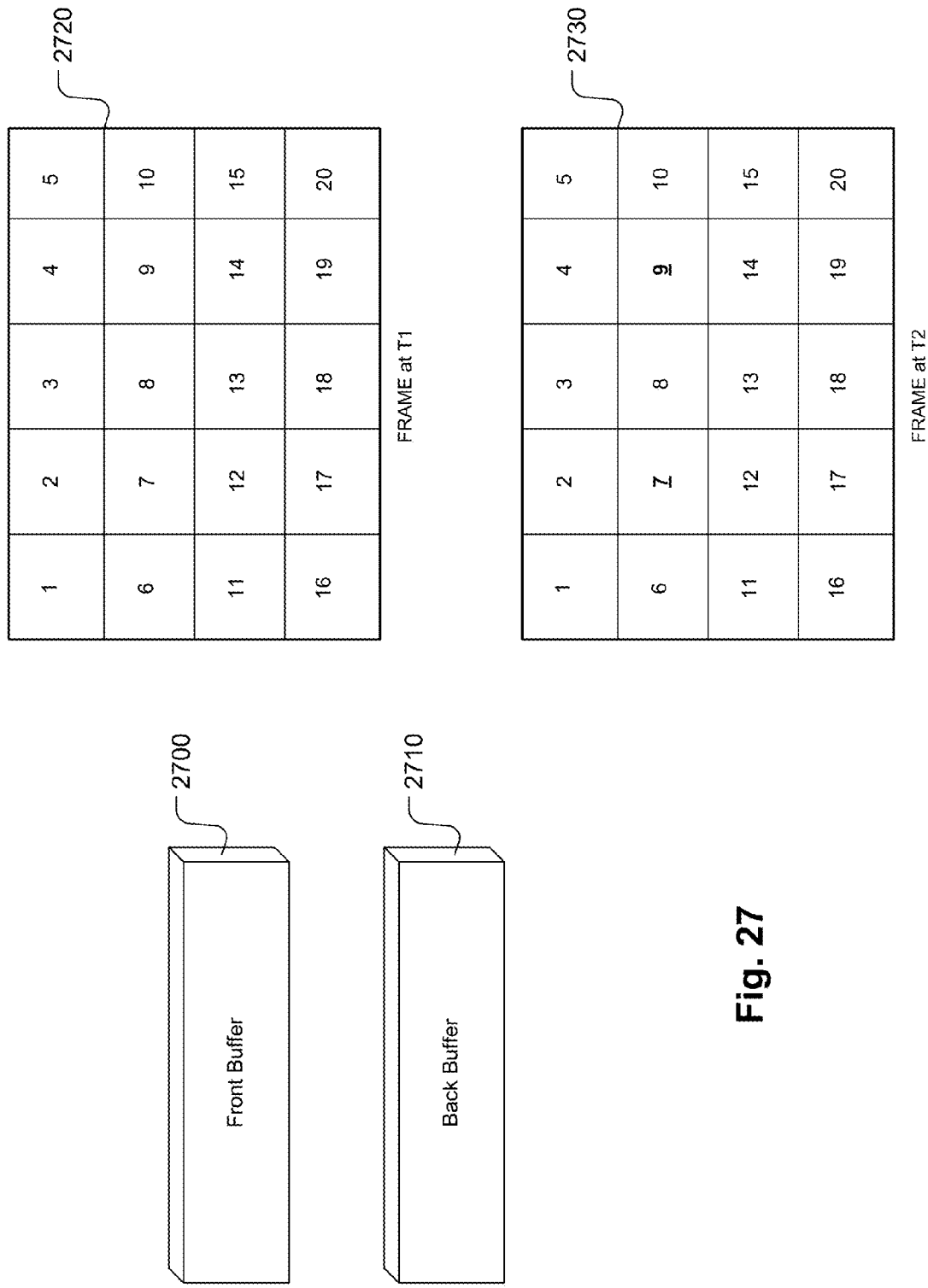
FIG. 27 illustrates an exemplary diagram illustrating a two buffer scheme.

Turning to FIG. 27, a video rendering system may include a front buffer 2700 and back buffer 2710. At frame time T1, front buffer 2700 may contain frame data 2720 which may be currently displayed on a client device. At frame time T2, the changed tiles may comprise tiles 7 and 9, which are encoded by the encoding system and transmitted to the client. The received tiles 7 and 9 may be stored in the back buffer 2710. The unchanged tiles are 1-6, 8, and 10-20 and therefore the most current tiles 1-6, 8, and 10-20 should be combined with changes tiles 7 and 9 to form the most up to date frame for frame time T2. However, back buffer 2710 does not necessarily hold the most current tiles 1-6, 8, and 10-20. Rather, tiles 1-6, 8, and 10-20 in back buffer 2710 will be stale because the buffer locations corresponding to tiles 1-6, 8, and 10-20 will hold stale tile data from previous time T0 (the frame time before T1). Therefore, in order to provide a current rendering of the latest frame data for frame time T2, data for tiles 1-6, 8, and 10-20 must be transferred from front buffer 2700 to back buffer 2710 before the system renders back buffer 2710.

Figure 28:
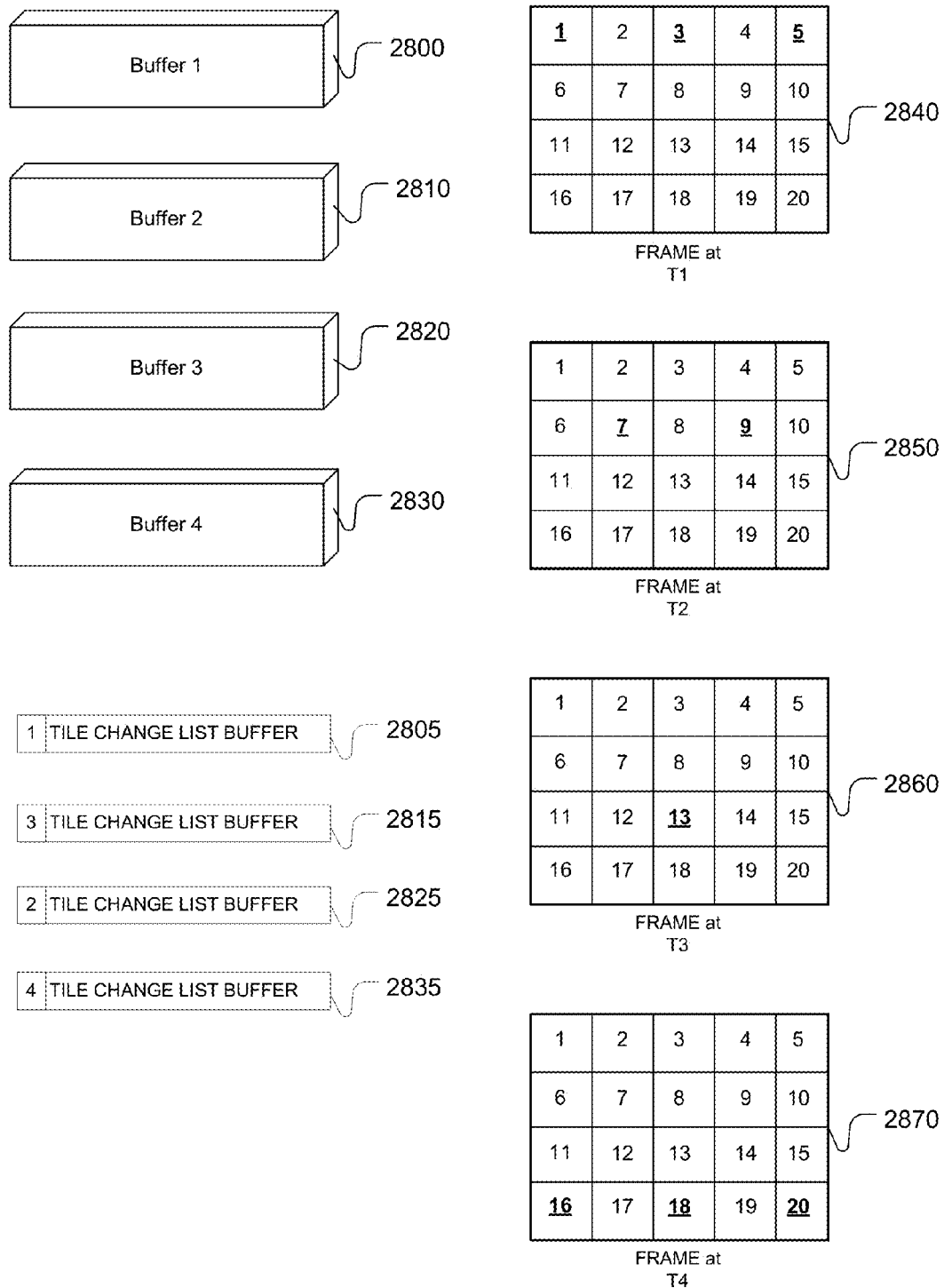
FIG. 28 illustrates an exemplary diagram illustrating an embodiment of some of the disclosed techniques.

FIG. 28 depicts one embodiment of the frame buffer management method disclosed herein. A video rendering system on a client device may comprise four buffers 2800 2810 2820 2830. Each buffer may comprise memory that contains a complete frame of data. The specific size of the buffers may vary depending on the format of the data. Referring to FIG. 28, at frame time T1, the encoding system may have determined that tiles 1, 3 and 5 have changed (changed tiles are indicated by underlined and bolded tile numbers) and encodes and transmits tiles 1, 3 and 5 to the video rendering system. The video rendering system may store the received tiles in buffer 1 2800. A first tile change list buffer 2805 may be used to keep track of which tiles changed within the decoded frame at frame time T1. Each cell of the first tile change list buffer 2805 may contain the frame number and may be updated when a tile is received from the encoder. In some embodiments the frame number may be used as a base pointer to frame buffer 1 2800.

Figure 29:
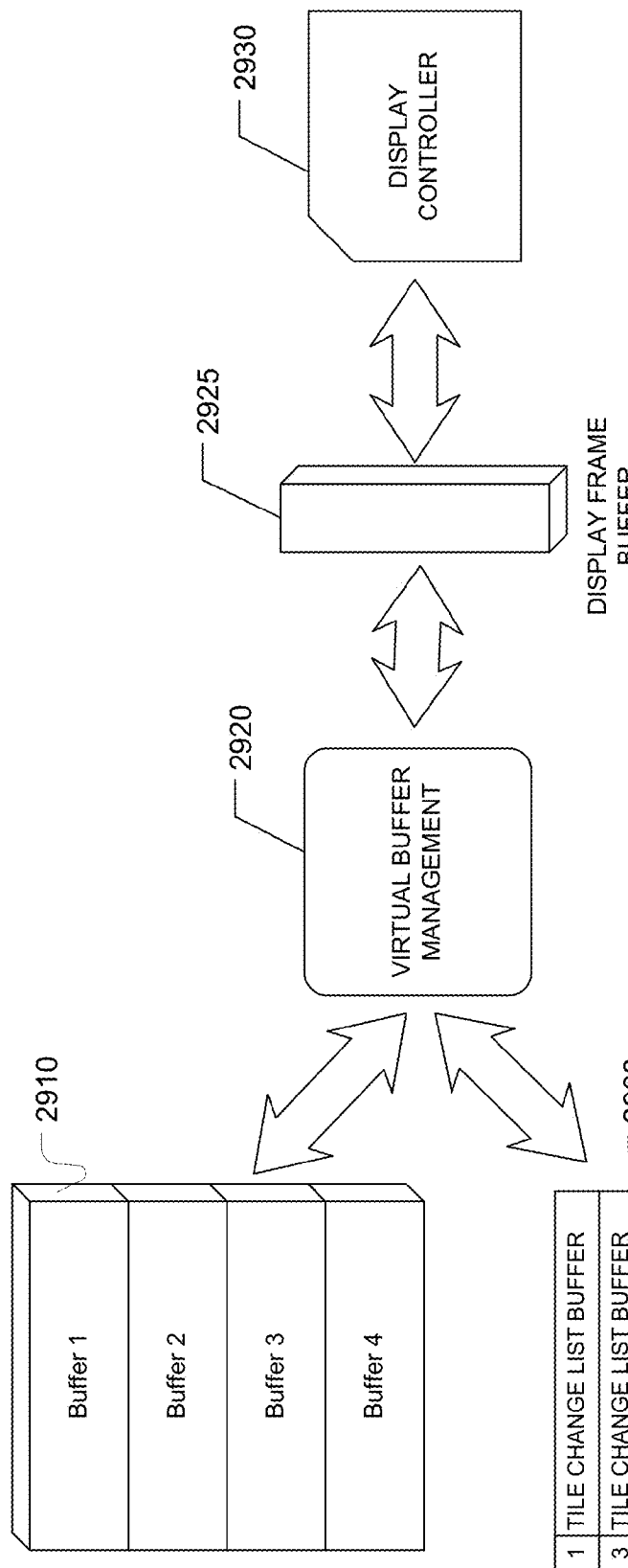
FIG. 29 illustrates an exemplary diagram illustrating an embodiment of some of the disclosed techniques.

Turning to FIG. 29, a virtual buffer management function 2920 may be used to provide the inputs in directing data to the display frame buffer 2925 to drive the display controller 2930. The display frame buffer 2925 may retrieve data tiles from across the four physical frame buffers 2910. Specific memory addresses of the changed tiles may be calculated based on the tile change list information contained in the tile change list buffers 2900.

Returning to FIG. 28, when a frame is completely decoded, the contents of the tile change list buffer may be copied from the current tile change list buffer 2805 to the next tile change list buffer 2815. This process may reduce memory traffic because the unchanged tile data does not have to be copied from physical buffer to physical buffer. Continuing with FIG. 28, at frame time T2, the encoding system may have determined that tiles 7 and 9 have changed and encodes and transmits tiles 7 and 9 to the video rendering system. The video rendering system may store the received tiles in buffer 2 2810. A second tile change list buffer 2815 may be used to keep track of which tiles have changed within the frame at frame time T2. Each cell of the second tile change list buffer 2815 may contain the frame number and may be updated when a tile is received from the encoder. In some embodiments the frame number may be used as a base pointer to frame buffer 2 2810. The process may be repeated for physical buffers 2820 and 2830 and tile change list buffers 2825 and 2835. The virtual buffer management function 2920 of FIG. 29 may use the data in the tile change list buffers 2900 to determine the most up to date data tiles for a desired frame time. Those skilled in the art will recognize that the use of four physical buffers and tile change list buffers are exemplary and that the principles illustrated herein may be applied to manage changed tiles in a variety of implementations in order to provide an efficient and responsive rendering system.

Figure 30:
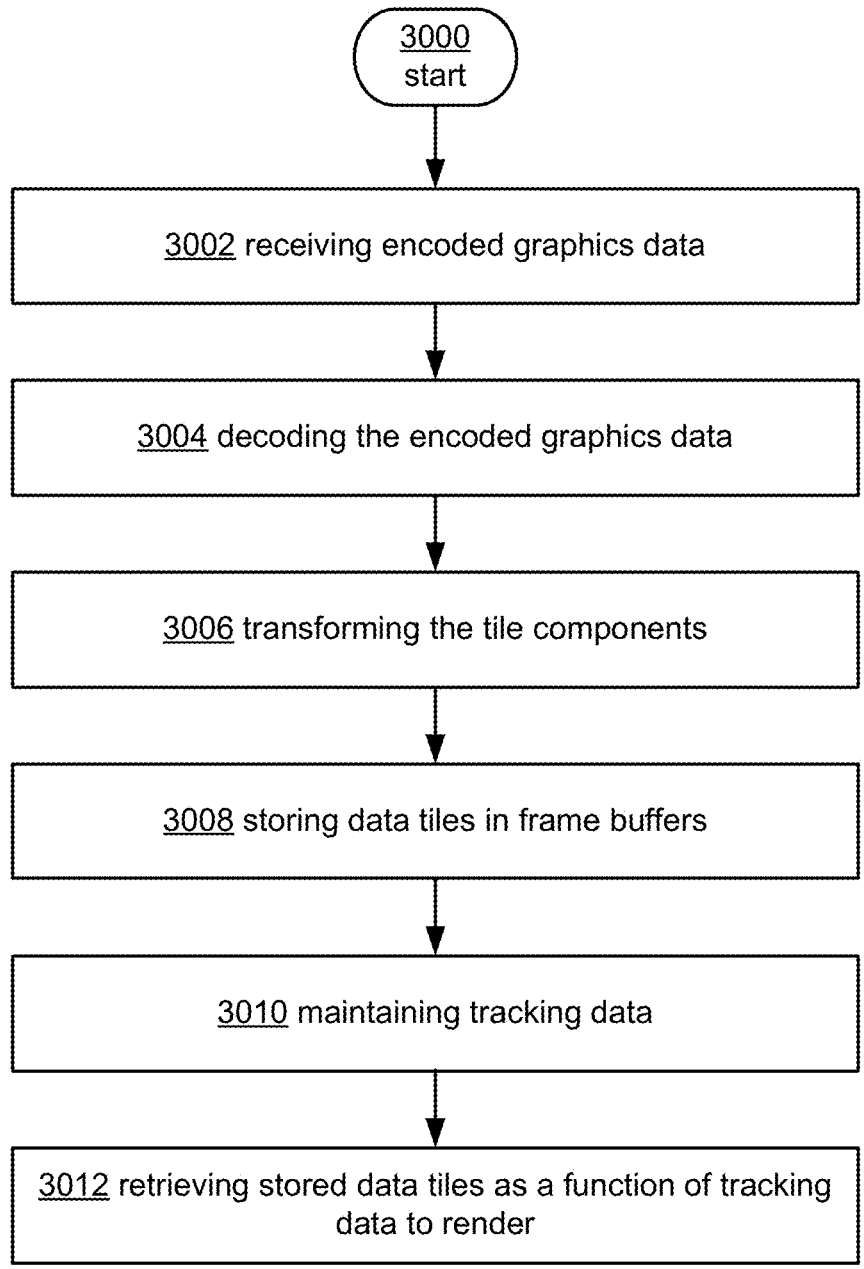
FIG. 30 illustrates an example of an operational procedure for decoding graphics data for use by a client computer.

FIG. 30 depicts an exemplary operational procedure for decoding graphics data for use by a client computer including operations 3000, 3002, 3004, 3006, 3008, 3010, and 3012. Referring to FIG. 30, operation 3000 begins the operational procedure and operation 3002 illustrates receiving encoded graphics data, the encoded graphics data representing source graphics data associated with an image frame of a virtual machine session and encoded by dividing said source graphics into data tiles comprising contiguous sections of the source graphics data, transforming said data tiles into tile components, and encoding the tile components to produce said encoded graphics data. Operation 3004 illustrates decoding the encoded graphics data to extract the tile components. Operation 3006 illustrates transforming the tile components into the data tiles. Operation 3008 illustrates storing said data tiles in a plurality of frame buffers. Operation 3010 illustrates maintaining tracking data for each of said data tiles, said tracking data identifying which one of said plurality of frame buffers stores said data tiles and which of said data tiles are associated with said image frame. Operation 3012 illustrates retrieving at least one of the stored data tiles as a function of said tracking data to render an image.

Figure 31:
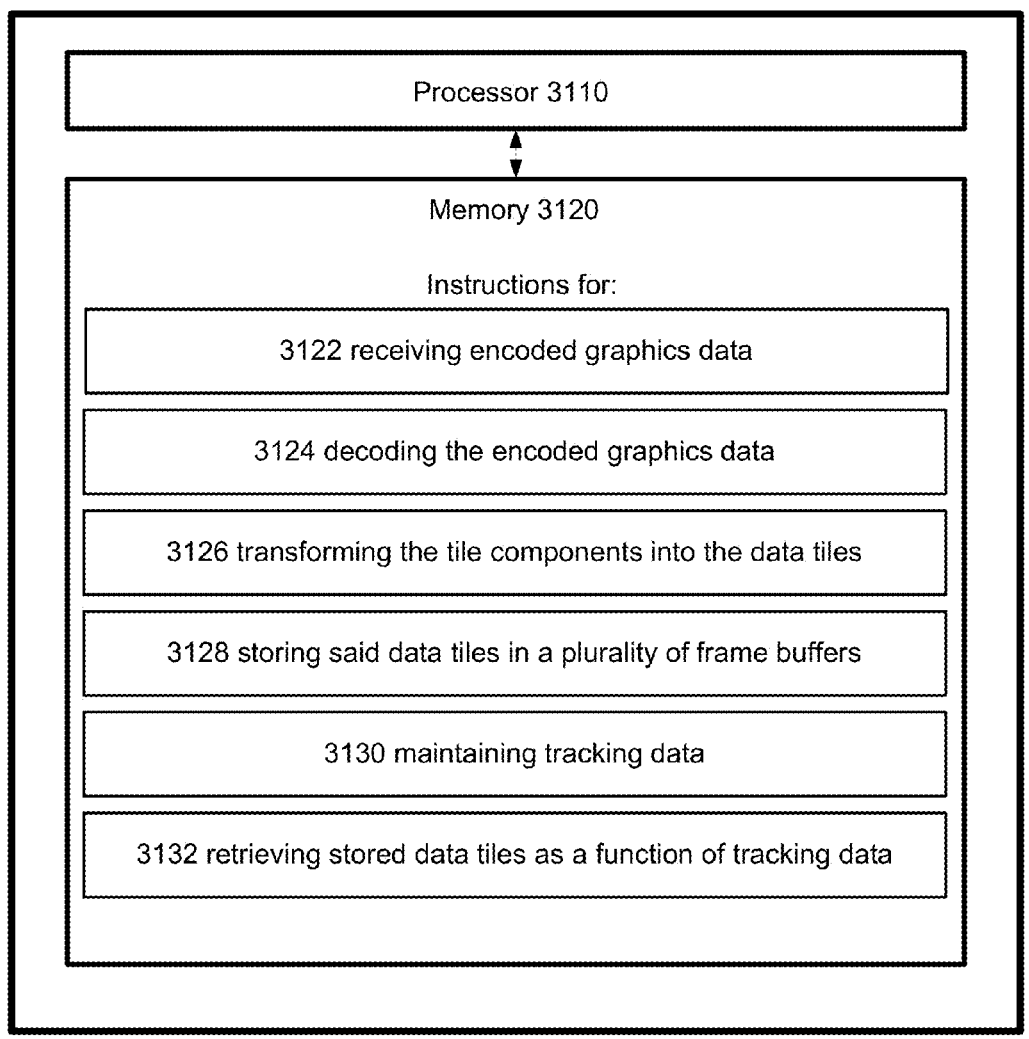
FIG. 31 illustrates an example system for processing graphics data.

FIG. 31 depicts an exemplary system for compressing data for transmission to a client computer as described above. Referring to FIG. 31, system 3100 comprises a process 3110 and memory 3120. Memory 3120 further comprises computer instructions configured to process graphics data. Block 3122 illustrates receiving encoded graphics data, the encoded graphics data representing source graphics data associated with an image frame and divided into data tiles comprising contiguous sections of the source graphics data. Block 3124 illustrates decoding the encoded graphics data to extract tile components. Block 3126 illustrates transforming the tile components into the data tiles. Block 3128 illustrates storing said data tiles in a plurality of frame buffers. Block 3130 illustrates maintaining tracking data for each of said data tiles. Block 3132 illustrates retrieving at least one of the stored data tiles as a function of said tracking data to render an image.

Any of the above mentioned aspects can be implemented in methods, systems, computer readable media, or any type of manufacture. As described above, aspects of the disclosure may execute on a programmed computer. FIG. 1 and the following discussion is intended to provide a brief description of a suitable computing environment in which the those aspects may be implemented. One skilled in the art can appreciate that the computer system of FIG. 1 can in some embodiments effectuate the server and the client of FIGS. 2-4. In these example embodiments, the server and client can include some or all of the components described in FIG. 1 and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multicore processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects and embodiments of the disclosure described herein have been shown and described, it will be apparent to those skilled in the art that, based upon the teachings herein, changes and modifications may be made and, therefore, the appended claims are to encompass within their scope all such changes and modifications as are within the true spirit and scope of the disclosures described herein.

What is claimed:

1. In a system comprising a processor and memory, a method for decoding graphics data for use by a client computer, the method comprising:
    receiving encoded graphics data, the encoded graphics data representing source graphics data associated with an image frame of a virtual machine session and encoded by dividing said source graphics into data tiles comprising contiguous sections of the source graphics data, transforming said data tiles into tile components, and encoding the tile components to produce said encoded graphics data;
    decoding the encoded graphics data to extract the tile components;
    transforming the tile components into the data tiles;
    storing said data tiles in a plurality of frame buffers, each of the frame buffers corresponding to one image frame of a group of successive image frames, and maintaining tracking data for each of said data tiles, said tracking data identifying which one of said plurality of frame buffers stores said data tiles and which of said data tiles are associated with said image frame; and
    determining most recently updated stored data tiles for each tile position as a function of said tracking data to render an image, the determined most recently updated stored data tiles selected so that one complete image frame is rendered using the most recently updated stored data tiles from the plurality of frame buffers.

2. The method of claim 1, wherein the tile components are YUV components.

3. The method of claim 1, wherein said decoding is entropy decoding.

4. The method of claim 3, further comprising performing a dequantization process on an output of said entropy decoding.

5. The method of claim 4, further comprising performing an inverse discrete wavelet transformation on an output of said dequantization process.

6. The method of claim 1, wherein each of said tile components are divided into a quantity of data slices corresponding to a number of concurrent processes for encoding the data slices, and said decoding comprises concurrently decoding the data slices.

7. The method of claim 1 wherein said plurality of frame buffers comprises four frame buffers.

8. The method of claim 1 wherein said tracking data comprises a frame identifier and a frame buffer identifier.

9. A system configured to process graphics data, comprising:
    at least one processor; and
    at least one memory communicatively coupled to said at least one processor, the system configured to perform the following acts:
    receiving encoded graphics data, the encoded graphics data representing source graphics data associated with an image frame and divided into data tiles comprising contiguous sections of the source graphics data;
    decoding the encoded graphics data to extract tile components;
    transforming the tile components into the data tiles;
    storing said data tiles in a plurality of frame buffers, each of the frame buffers corresponding to one image frame of a group of successive image frames, and maintaining tracking data for each of said data tiles; and
    determining most recently updated stored data tiles for each tile position as a function of said tracking data to render an image, the determined most recently updated stored data tiles selected so that one complete image frame is rendered using the most recently updated stored data tiles from the plurality of frame buffers.

10. The system of claim 9, wherein the encoded graphics data is encoded by transforming said data tiles into tile components and encoding the tile components to produce said encoded graphics data.

11. The system of claim 9, wherein said tracking data identifies which one of said plurality of frame buffers stores said data tiles and which of said data tiles are associated with said image frame.

12. The system of claim 9, wherein said image frame is associated with a virtual machine session.

13. The system of claim 9, wherein said encoded graphics data is received using Remote Desktop Protocol.

14. The system of claim 9, wherein the system is a client computing device further comprising a display.

15. The system of claim 9, wherein said plurality of frame buffers comprises four frame buffers.

16. The system of claim 9 wherein said tracking data comprises a frame identifier and a frame buffer identifier.

17. A system for decoding graphics data, comprising:
    means for receiving encoded graphics data, the encoded graphics data representing source graphics data associated with an image frame divided into data tiles comprising contiguous sections of the source graphics data;
    means for decoding the encoded graphics data to extract the data tiles;
    means for storing said data tiles in a plurality of frame buffers, each of the frame buffers corresponding to one image frame of a group of successive image frames, and maintaining tracking data for each of said data tiles; and
    means for determining most recently updated stored data tiles for each tile position as a function of said tracking data to render an image, the determined most recently updated stored data tiles selected so that one complete image frame is rendered using the most recently updated stored data tiles from the plurality of frame buffers.

18. The system of claim 17, wherein the encoded graphics data is encoded by transforming said data tiles into tile components, and encoding the tile components to produce said encoded graphics data.

19. The system of claim 17, wherein said tracking data identifies which one of said plurality of frame buffers stores said data tiles and which of said data tiles are associated with said image frame.

20. The system of claim 17, wherein said plurality of frame buffers is four frame buffers.

* * * * *